US012704376B2

(12) United States Patent
Di Capua et al.

(10) Patent No.: US 12,704,376 B2
(45) Date of Patent: Aug. 11, 2026

(54) SYSTEMS AND METHODS FOR DYNAMIC MAPPING AND ROUTING USING MACHINE LEARNING

(71) Applicant: UBER TECHNOLOGIES, INC., San Francisco, CA (US)

(72) Inventors: Max Vito Di Capua, Walnut Creek, CA (US); Hiroshi Antonio Mendoza, San Francisco, CA (US)

(73) Assignee: UBER TECHNOLOGIES, INC., San Francisco, CA (US)

(*) Notice: Subject to any disclaimer, the term of this patent is extended or adjusted under 35 U.S.C. 154(b) by 103 days.

(21) Appl. No.: 18/638,988

(22) Filed: Apr. 18, 2024

(65) Prior Publication Data

US 2024/0353228 A1 Oct. 24, 2024

Related U.S. Application Data

(60) Provisional application No. 63/496,837, filed on Apr. 18, 2023.

(51) Int. Cl.

*G01C 21/20* (2006.01)
*G06Q 30/0601* (2023.01)
*H04W 4/02* (2018.01)

(52) U.S. Cl.

CPC ....... *G01C 21/206* (2013.01); *G06Q 30/0631* (2013.01); *G06Q 30/0639* (2013.01); *H04W 4/025* (2013.01)

(58) Field of Classification Search

CPC .... G01C 21/206; G06Q 30/063; G06Q 30/01; G06Q 30/0639; H04W 4/025

See application file for complete search history.

(56) References Cited

U.S. PATENT DOCUMENTS 10,417,605 B1 * 9/2019 Liu .................... G06Q 30/0635
2015/0294395 A1 10/2015 Deshpande et al.

(Continued)

OTHER PUBLICATIONS

Kothavale et al., "Smart Indoor Navigation, Shopping Recommendation & Queue less billing based shopping assistant using AI," 2021 International Conference on Artificial Intelligence and Machine Vision (AIMV), Gandhinagar, India, 2021, pp. 1-4, doi: 10.1109/AIMV5 (Year: 2021).*

(Continued)

*Primary Examiner* — George Chen
*Assistant Examiner* — Tayar M Kyu
(74) *Attorney, Agent, or Firm* — Dority & Manning, P.A.

(57) ABSTRACT

Systems and methods for dynamic mapping and routing using machine learning. The system can access requested items, a map, and process data signals to generate route segments that indicate a path to the requested items. The method includes accessing data associated with a delivery request that includes requested items. The method includes accessing map data associated with the initial location of the items. The method includes processing data signals from computing devices to confirm an initial location of an item, determine a new location of an item, or determine an availability of an item. The method includes iteratively generating a plurality of route segments for a user to follow that indicates a path to the requested items. The method includes outputting a command instruction to generate a user interface that iteratively displays each route segment based on the user selecting or disregarding the respective items.

20 Claims, 10 Drawing Sheets

(56) References Cited

U.S. PATENT DOCUMENTS

| | | | | |
|---|---|---|---|---|
| 2020/0387948 | A1 | 12/2020 | Kurani et al. | |
| 2021/0342588 | A1* | 11/2021 | Davis | G06V 10/764 |
| 2022/0237530 | A1 | 7/2022 | Franey et al. | |
| 2022/0397400 | A1* | 12/2022 | Adegbenro | G06Q 30/0631 |
| 2023/0121652 | A1* | 4/2023 | Francis | G06Q 30/0639 705/26.8 |
| 2023/0237431 | A1* | 7/2023 | Glaser | H04W 4/029 705/28 |

OTHER PUBLICATIONS

International Search Report and Written Opinion for Application No. PCT/US2024/025148, mailed Aug. 29, 2024, 14 pages.

* cited by examiner

| COMPUTING DEVICE MEMORY 200 | | |
|---|---|---|
| 205 | REQUEST IDENTIFIER | X999999 |
| 210 | USER PREFERENCES | X.XXX |
| 215 | CANDIDATE COURIERS | X.XXX |
| 220 | DROP-OFF LOCATION | X.XXX |
| 225 | MERCHANT DATA | X.XXX |

| MERCHANT 225 | | |
|---|---|---|
| 235 | LOCATION | X.XXX |
| 240 | INVENTORY | X.XXX |
| 245 | HOURS | 8AM-1AM |
| 250 | ESTIMATED TIME TO PACK | X.XXX |

| INVENTORY 240 | | | | |
|---|---|---|---|---|
| ITEM ID 241 | SECTION 242 | AISLE 243 | QUANTITY 244 | USER PREFERENCE SELECTIONS 246 |
| BANANAS | PRODUCE 240A | 2 | 108 244A | RIPENESS 6/10 210A |
| ORANGES | PRODUCE 240B | 3 | 67 244B | PRIORITY 210B |
| CHICKEN NUGGETS | PANTRY 240C | 18 | 1 244C | REPLACEMENT 210C |
| MILK | DAIRY 240D | 23 | 0 244D | N/A 210D |

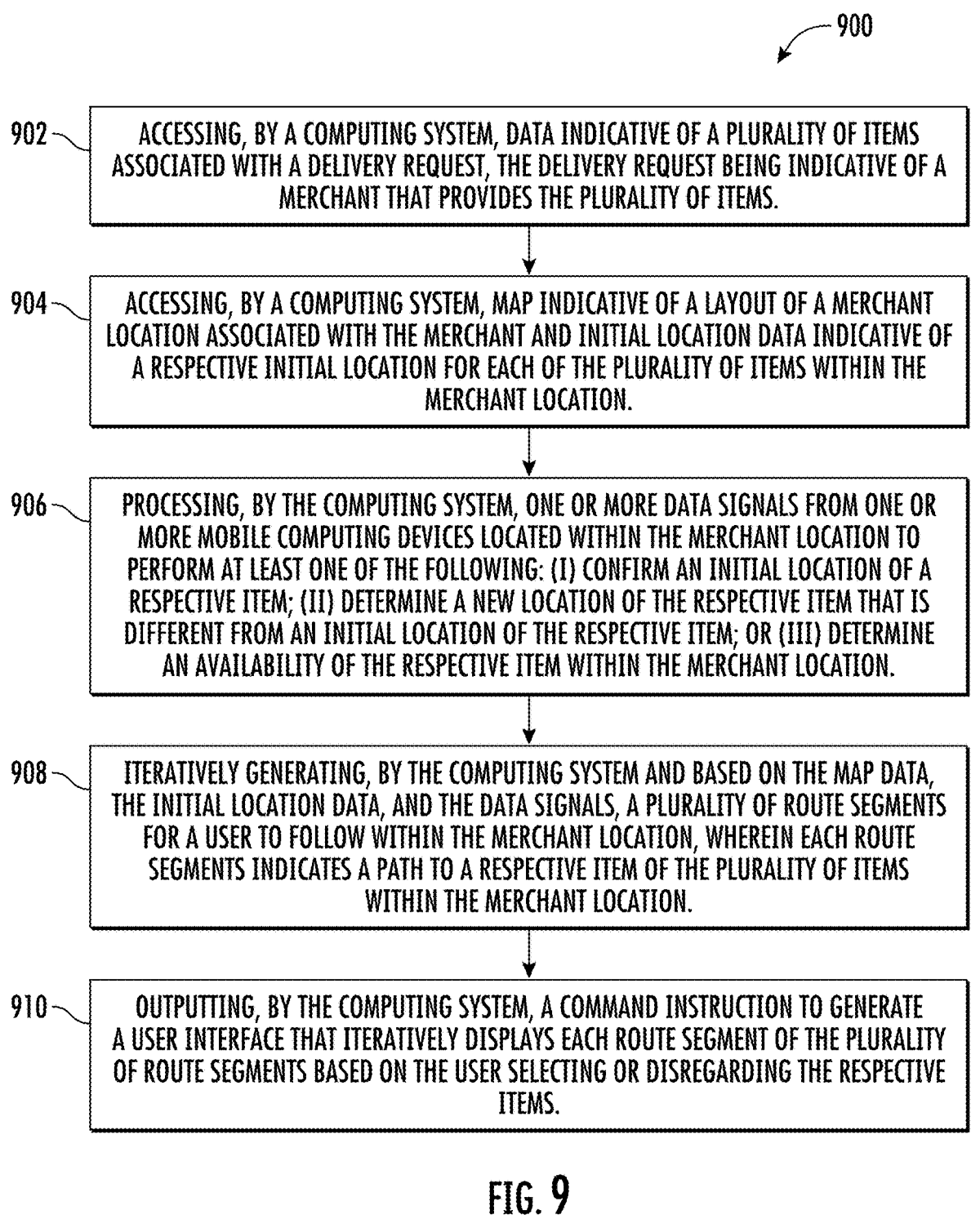

902 ACCESSING, BY A COMPUTING SYSTEM, DATA INDICATIVE OF A PLURALITY OF ITEMS ASSOCIATED WITH A DELIVERY REQUEST, THE DELIVERY REQUEST BEING INDICATIVE OF A MERCHANT THAT PROVIDES THE PLURALITY OF ITEMS.

904 ACCESSING, BY A COMPUTING SYSTEM, MAP INDICATIVE OF A LAYOUT OF A MERCHANT LOCATION ASSOCIATED WITH THE MERCHANT AND INITIAL LOCATION DATA INDICATIVE OF A RESPECTIVE INITIAL LOCATION FOR EACH OF THE PLURALITY OF ITEMS WITHIN THE MERCHANT LOCATION.

906 PROCESSING, BY THE COMPUTING SYSTEM, ONE OR MORE DATA SIGNALS FROM ONE OR MORE MOBILE COMPUTING DEVICES LOCATED WITHIN THE MERCHANT LOCATION TO PERFORM AT LEAST ONE OF THE FOLLOWING: (I) CONFIRM AN INITIAL LOCATION OF A RESPECTIVE ITEM; (II) DETERMINE A NEW LOCATION OF THE RESPECTIVE ITEM THAT IS DIFFERENT FROM AN INITIAL LOCATION OF THE RESPECTIVE ITEM; OR (III) DETERMINE AN AVAILABILITY OF THE RESPECTIVE ITEM WITHIN THE MERCHANT LOCATION.

908 ITERATIVELY GENERATING, BY THE COMPUTING SYSTEM AND BASED ON THE MAP DATA, THE INITIAL LOCATION DATA, AND THE DATA SIGNALS, A PLURALITY OF ROUTE SEGMENTS FOR A USER TO FOLLOW WITHIN THE MERCHANT LOCATION, WHEREIN EACH ROUTE SEGMENTS INDICATES A PATH TO A RESPECTIVE ITEM OF THE PLURALITY OF ITEMS WITHIN THE MERCHANT LOCATION.

910 OUTPUTTING, BY THE COMPUTING SYSTEM, A COMMAND INSTRUCTION TO GENERATE A USER INTERFACE THAT ITERATIVELY DISPLAYS EACH ROUTE SEGMENT OF THE PLURALITY OF ROUTE SEGMENTS BASED ON THE USER SELECTING OR DISREGARDING THE RESPECTIVE ITEMS.

FIG. 9

SYSTEMS AND METHODS FOR DYNAMIC MAPPING AND ROUTING USING MACHINE LEARNING

PRIORITY CLAIM

This application claims priority to and the benefit of U.S. Provisional Patent Application No. 63/496,837 filed on Apr. 18, 2023. U.S. Provisional Patent Application No. 63/496,837 is hereby incorporated by reference in its entirety.

FIELD

The present disclosure generally relates to dynamically generating maps and route segments using machine-learned models trained to ingest data signals from proximate computing systems. More particularly, the present disclosure is directed to using machine-learned models to generate a plurality of route segments that indicates a path of travel through an environment to locate requested items.

BACKGROUND

Food delivery services allow a user to request a service that may be performed by a vehicle or courier. For instance, a user may request, through a delivery service application, a grocery delivery service having a pick-up location, a drop-off location, and items for delivery. A courier may be assigned to perform the grocery delivery service for the user. This may include selecting items from a pick-up location and transporting the items to a drop-off location.

SUMMARY

Aspects and advantages of embodiments of the present disclosure will be set forth in part in the following description, or may be learned from the description, or may be learned through practice of the embodiments.

In an example aspect, the present disclosure provides an example computer-implemented method. The example method includes accessing, by a computing system, data indicative of a plurality of items associated with a delivery request, the delivery request being indicative of a merchant that provides the plurality of items. The example method includes, accessing, by the computing system, map data indicative of a layout of a merchant location associated with the merchant and initial location data indicative of a respective initial location for each of the plurality of items within the merchant location. The example method includes, processing, by the computing system, one or more data signals from one or more mobile computing devices located within the merchant location to perform at least one of the following: (i) confirm an initial location of a respective item; (ii) determine a new location of the respective item that is different from an initial location of the respective item; or (iii) determine an availability of the respective item within the merchant location. The example method includes, iteratively generating, by the computing system and based on the map data, the initial location data, and the data signals, a plurality of route segments for a user to follow within the merchant location, wherein each route segments indicates a path to a respective item of the plurality of items within the merchant location. The example method includes, outputting, by the computing system, a command instruction to generate a user interface that iteratively displays each route segment of the plurality of route segments based on the user selecting or disregarding the respective items.

In some example implementations, the example method includes, receiving, by the computing system, input data based on the user disregarding the respective item, wherein the user disregarding the respective item is indicative of the respective item being unavailable at the merchant location. In some example implementations, the example method includes, determining, by the computing system, a replacement item and a replacement item location, wherein the replacement item is indicative of an alternative item to replace the respective item. In some example implementations, the example method includes, generating, by the computing system, an updated plurality of route segments wherein at least one of the updated plurality of route segments indicates a path to the replacement item location. In some example implementations, the example method includes, outputting, by the computing system, an updated command instruction to generate an updated user interface that displays the updated plurality of route segments.

In some example implementations, the example method includes, determining, by the computing system, a category of each of the plurality of items, wherein the category is indicative of a region of the merchant location. In some example implementations, the example method includes, determining, by the computing system, one or more items of the plurality of items is located in a common region of the merchant location. In some example implementations, the example method includes, outputting, by the computing system, a command instruction to generate an item user interface that displays each of the plurality of items based on the category.

In some example implementations, iteratively generating a plurality of route segments includes, accessing, by the computing system, priority data for each of the plurality items wherein the priority data indicates items needed for completion of the delivery request. In some example implementations, iteratively generating a plurality of route segments includes, determining, by the computing system, an order of the plurality of route segments based on the priority data. In some example implementations, iteratively generating a plurality of route segments includes, generating, by the computing system, a plurality of prioritized route segments wherein the plurality of prioritized route segments indicates a path to one or more priority items prior to a path of one or more non-priority items.

In some example implementations, the example method includes, determining, by the computing system, at least one priority item of the one or more priority items is unavailable based on the user disregarding the priority item. In some example implementations, the example method includes, outputting, by the computing system, an updated command instruction to generate a cancellation user interface indicating the delivery request has been cancelled.

In some example implementations, processing one or more data signals includes, determining, by the computing system, the one or more data signals were generated within a threshold time associated with the delivery request.

In some implementations, processing one or more data signals includes determining an approximate location of at least one mobile computing device of the one or more mobile computing devices.

In some example implementations, map data is generated from a lidar scan.

In some example implementations, the example method includes, accessing, by the computing system, motion data generated by a user device of the user, the motion data indicative of at least one of the following: (i) an orientation, (ii) acceleration, or (iii) an elevation of the user device. In some example implementations, the example method includes, determining, by the computing system, a location of the user within the merchant location based on the motion data, the location being associated with a position on the layout of the merchant location.

In some example implementations, the example method includes, determining, by the computing system, each of the plurality of items has been respectively selected or disregarded. In some example implementations, the example method includes, generating, by the computing system, a checkout route segment for the user to follow to a checkout location within the merchant location. In some example implementations, the example method includes, outputting, by the computing system, a command instruction to display the checkout route segment.

In another example aspect, the present disclosure provides an example computing system. The example computing system includes one or more processors and one or more non-transitory, computer readable medium storing instructions that are executable by the one or more processors to cause the computing system to perform operations. The example operations include accessing data indicative of a plurality of items associated with a delivery request, the delivery request being indicative of a merchant that provides the plurality of items. The example operations include accessing map data indicative of a layout of a merchant location associated with the merchant and initial location data indicative of a respective initial location for each of the plurality of items within the merchant location. The example operations include processing one or more data signals from one or more mobile computing devices located within the merchant location to perform at least one of the following: (i) confirm an initial location of a respective item; (ii) determine a new location of the respective item that is different from an initial location of the respective item; or (iii) determine an availability of the respective item within the merchant location. The example operations include based on the map data, the initial location data, and the data signals, iteratively generating a plurality of route segments for a user to follow within the merchant location, wherein each route segments indicates a path to a respective item of the plurality of items within the merchant location. The example operations include, outputting, by the computing system, a command instruction to generate a user interface that iteratively displays each route segment of the plurality of route segments based on the user selecting or disregarding the respective items.

In some implementations the example operations include, receiving input data based on the user disregarding the respective item, wherein the user disregarding the respective item is indicative of the respective item being unavailable at the merchant location. In some implementations the example operations include, determining a replacement item and a replacement item location, wherein the replacement item is indicative of an alternative item to replace the respective item. In some implementations the example operations include, generating an updated plurality of route segments wherein at least one of the updated plurality of route segments indicates a path to the replacement item location. In some implementations the example operations include, outputting an updated command instruction to generate an updated user interface that displays the updated plurality of route segments.

In some implementations the example operations include, determining, by the computing system, a category of each of the plurality of items, wherein the category is indicative of a region of the merchant location. In some implementations the example operations include, determining, by the computing system, one or more items of the plurality of items is located in a common region of the merchant location. In some implementations the example operations include, outputting, by the computing system, a command instruction to generate an item user interface that displays each of the plurality of items based on the category.

In some implementations, iteratively generating a plurality of route segments includes, accessing, by the computing system, priority data for each of the plurality items wherein the priority indicates items which are essential to complete the delivery request. In some implementations, iteratively generating a plurality of route segments includes, determining, by the computing system, an order of the plurality of route segments based on the priority data. In some implementations, iteratively generating a plurality of route segments includes generating, by the computing system, a plurality of prioritized route segments wherein the plurality of prioritized route segments indicates a path to priority items prior to a path of one or more non-priority items.

In some implementations the example operations include, determining, by the computing system, at least one priority item of the one or more priority items is unavailable based on the user disregarding the priority item. In some implementations the example operations include, outputting, by the computing system, an updated command instruction to generate a cancellation user interface indicating the delivery request has been cancelled.

In some implementations, processing one or more data signals comprises, determining, by the computing system, the one or more data signals were generated within a threshold time associated with the delivery request.

In some implementations, processing one or more data signals includes determining an approximate location of at least one mobile computing device of the one or more mobile computing devices.

In some implementations, the map data is generated from a lidar scan.

In some implementations, the example operations include, accessing, by the computing system, motion data generated by a user device of the user, the motion data indicative of at least one of the following: (i) an orientation, (ii) acceleration, or (iii) an elevation of the user device. In some implementations, the example operations include, determining, by the computing system, a location of the user within the merchant location based on the motion data, the location being associated with a position on the layout of the merchant location.

In some implementations the example operations include, determining, by the computing system, each of the plurality of items has been selected or disregarded. In some implementations the example operations include, generating, by the computing system, a checkout route segment for the user to follow to a checkout location within the merchant location. In some implementations the example operations include, outputting, by the computing system, a command instruction to display the checkout route segment.

In an example aspect, the present disclosure provides an example computer-implemented method. The example method includes accessing, by a computing system, data indicative of a plurality of items associated with a delivery request, the delivery request being indicative of a merchant that provides the plurality of items. The example method includes accessing, by the computing system, map data indicative of a layout of a merchant location associated with the merchant and initial location data indicative of an initial location of at least a first item of the plurality of items within the merchant location. The example method includes generating, by the computing system and based on the map data and the initial location data, a first route segment for a user to follow to a first location of the first item within the merchant location. The example method includes, outputting, by the computing system, a command instruction to generate a user interface that indicates the first route segment and the first location of the first item within the merchant location. The example method includes, processing, by the computing system, one or more data signals from one or more mobile computing devices located within the merchant location to perform at least one of the following: (i) confirm an initial location of a second item; (ii) determine a new location of the second item that is different from an initial location of the second item; or (iii) determine an availability of the second item within the merchant location. The example method includes generating, by the computing system and based on the map data and the one or more data signals, a second route segment for the user to follow from the first location to a second location of the second item within the merchant location. The example method includes, receiving, by the computing system, user input data indicating the first item was selected or disregarded. The example method includes, in response to receiving the user input data, outputting, by the computing system, a command instruction to display the second route segment and the second location of the second item within the merchant location.

In some example implementations, the example method includes, determining, by the computing system, a replacement item and a replacement item location, wherein the replacement item is indicative of an alternative item to replace the second item. In some example implementations, the example method includes, generating, by the computing system, an updated second route segment wherein the updated second route segment indicates a path to the replacement item location. In some example implementations, the example method includes, outputting, by the computing system, an updated command instruction to generate an updated user interface that displays the updated second route segment.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example data structure of a memory according to example embodiments of the present disclosure.

FIG. 9 depicts a flowchart diagram of an example method according to example aspects of the present disclosure.

DETAILED DESCRIPTION

Figure 1:
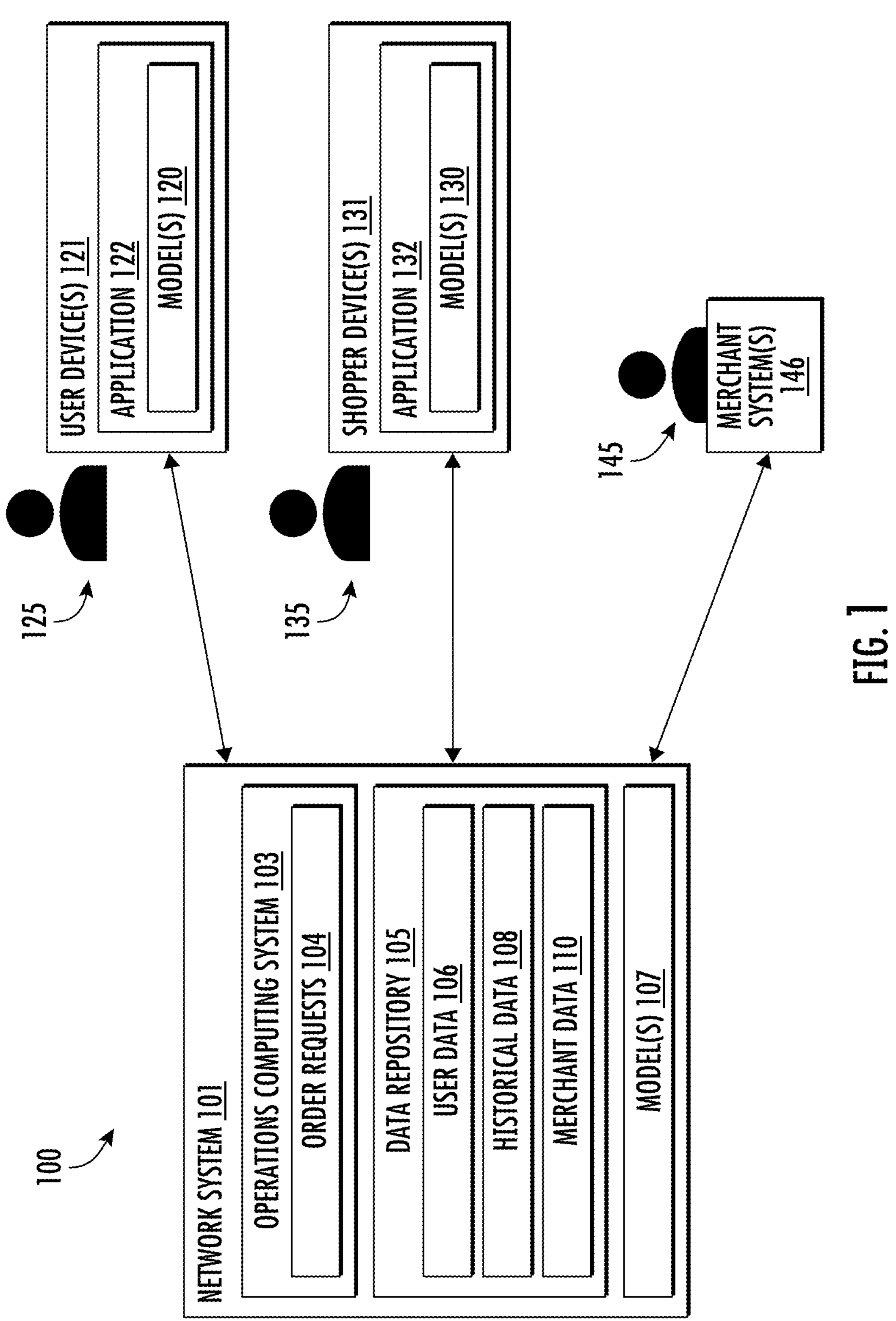
FIG. 1 depicts an example computing ecosystem according to example aspects of the present disclosure.

Generally, the present disclosure is directed to improvements in presenting real-time indoor mapping and routing. For example, a service entity (e.g., food delivery coordination entity) can utilize a pool of couriers to coordinate delivery services (e.g., food delivery) for requesting users. The requesting users can request the delivery of food items from a merchant location (e.g., grocery store, retail store, etc.) through a software application running on the requesting user device. The service entity's operations computing system can process the request to match the requesting user to a courier for the requested delivery service through a software application running on the courier user device (e.g., the couriers' mobile phones) as well as a merchant.

A shopper can be used to retrieve the items from the merchant location for the request. The shopper can include the courier, or an individual associated with the merchant (e.g., a designated shopper at a merchant location). The shopper can be associated with a mobile user device (hereinafter "shopper device"). In some implementations, the shopper device can be the courier user device in the event the shopper is the courier. In some implementations, the shopper device can be a user device associated with a designated shopper at the merchant location. According to example aspects of the present disclosure, the service operations computing system can utilize one or more data signals to plan and generate route segments and update the user interface of the shopper device to iteratively indicate a path to each requested item within the merchant location in real-time.

For example, the service operations computing system can access map data that includes a layout of the merchant location. The map data can include the location of the requested items within the merchant location. For instance, the requesting user can request produce and pantry items and the map data can include the specific aisle and shelf where the produce and pantry items are located within the merchant location. In some examples, the map data can be generated using a lidar scan of the merchant location. In other examples, the map data can be generated using indoor mapping programs.

The operations computing system can process data signals from one or more mobile computing devices within the merchant location to generate route segments that indicates a path to the food items. The data signals can be generated by other shopper devices within the same merchant location, or an individual associated with the merchant. By way of example, the data signals can confirm the location of an item, indicate a new location of the item, or indicate that the item is unavailable. In some examples, the data signals may be used to approximate the location of the shopper device in order to provide routing to the location of the next item.

The operations computing system can process the one or more data signals and utilize the map data to generate route segments that indicate a path to the items. For instance, a data signal indicating that shopper device scanned a first item and a second item within seconds of each other may indicate an approximate location of the shopper within the merchant location. Based on the data signals indicate the approximate location of the shopper device within the merchant location, the operations computing system may provide routing to a next item.

In some examples, the data signals can be processed within a threshold time from the delivery request. For example, data signals processed within the same day as the delivery request can indicate more recent activity within the merchant location. In some examples, route segments can be updated based on data signals processed while the shopper is within the merchant location.

The operations computing system can output a command instruction to generate a user interface of the shopper device that displays a plurality of route segments. For example, the user interface can display a complete shopper route that indicates a complete path to all items. In some examples, the route segments can be iteratively generated and displayed once the shopper indicates an item has been selected or disregarded. In other examples, the route segments can be updated based on more recent data signals or user input by the shopper.

The technology of the present disclosure provides improvements over traditional routing technologies. For instance, the technology of the present disclosure can enable routing of a shopper without determining the precise location of the shopper within a merchant location. By processing data signals indicating a time where items were scanned, the technology of the present disclosure may approximate the location of the shopper and provide routing based on the approximate location. As such the computing system may preserve computing resources by alleviating the need constantly track the shoppers location over time.

The technology of the present disclosure can provide a number of benefits and technical effects. For instance, the technology of the present disclosure can allow a shopper to be presented with turn-by turn directions generated in real-time within a merchant location. This can include route segments that are generated and updated based on recent activity occurring within the merchant location. As such, the technology can increase the efficiency of a shopper navigating an unfamiliar merchant location. Moreover, by generating and updating route segments in real-time using data signals from other computing devices within the merchant location, the technology of the present disclosure can increase the accuracy of indoor routing and improve satisfaction of couriers for food delivery services. The technology of the present disclosure can help to increase the computing efficiency (e.g., processing, power, etc.) for delivery requests by reducing the need to generate additional routes to re-route the shopper while increasing the efficiency of the shopper.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations may be made to the embodiments without departing from the scope of the present disclosure. For instance, features illustrated or described as part of one embodiment may be used with another embodiment to yield a still further embodiment. Thus, it is intended that aspects of the present disclosure cover such modifications and variations.

For example, the following describes the technology of this disclosure within the context of a mobile shopper device within a grocery store for example purposes only. As described herein, the technology described herein is not limited to a mobile shopper device in grocery stores and may be implemented for or within any location where items are available for purchase and other computing systems.

FIG. 1 depicts an example computing ecosystem according to example aspects of the present disclosure. The example system 100 may include a network system 101, one or more users 125 associated with one or more user devices 121, one or more shoppers 135 associated with one or more shopper devices 131, and one or more merchants 145 associated with one or more merchant systems 146. In some examples the one or more merchants 145 may be associated with the shopper devices 131 (e.g., a designated shopper at a merchant location). The example system 100 may facilitate delivery services between the users 125 and the merchants 145 by utilizing shoppers 135 to retrieve requested items from merchant locations associated with the merchants 145. This can include, for example, a grocery delivery service that includes the retrieval of one or more grocery items.

With respect to examples as described herein, the system 100 may be implemented on a server, on a combination of servers, or on a distributed set of computing devices which communicate over a network such as the Internet. For example, the system 100 may be distributed using one or more servers and/or mobile devices. In other examples, the system 100 may be implemented as part of, or in connection with a network system 101, where, for example, operators (e.g., shoppers 135, couriers, etc.) use service vehicles to provide grocery delivery services for requesting users 125. In some examples, the system 100 may be implemented using mobile devices of users (e.g., user devices 121, shopper devices 131) associated with users 125, shoppers 135 and merchants 145 with the individual devices executing a corresponding service application (e.g., application 122, application 132) that causes the computing device to operate as an information inlet and/or outlet for the network system 101. In other examples, the system 100 may be implemented using one or more merchant systems 146 associated with one or more merchants 145. The merchant system 146 may operate as an information inlet and/or outlet for the system 100 to exchange data with the network system 101.

The network system 101 may include a number of systems and components for performing various operations. For example, the network system 101 may include an operations computing system 103, data repository 105, and one or more machine-learned models 107. The network system 101 may be any computing device that is capable of exchanging data and sharing resources. For example, the network system 101 may include one or more networked devices configured to store or transmit data over physical or wireless technologies. In some examples, the network system 101 may include hardware and software. In other examples, the network system 101 may include physical equipment that is connected to a physical network.

The network system 101 may include an operations computing system 103. In some examples, the operations computing system 103 may be implemented by one or more computing devices. For example, the operations computing system 103 may include one or more processors and one or more memory devices. The one or more memory devices may store instructions executable by the one or more processors to cause the one or more processors to perform operations or functions associated with other systems or components of the network system 101.

In some examples, the operations computing system 103 may include an order request system 104 configured to receive order requests from users 125 for grocery delivery services. For example, a user 125 may submit a grocery delivery service order request through an application 122 running on the user device 121 associated with the user 125. In some examples, the order request system 104 may receive a single grocery delivery service order request from a user 125. In some examples, the order request system 104, may receive multiple grocery delivery service order requests from multiple users 125. In some examples, the order request system 104 may coordinate multiple grocery delivery service order requests from the same user 125 which require selection or delivery of grocery items from multiple merchant locations.

The order request system 104 may perform actions to coordinate a completion time of an order request including an estimated time of arrival for requested items. In some examples, where the merchant 145 or an individual associated with the merchant 145 is associated with the shopper device 131, the order request system 104 may coordinate actions to ensure a courier (e.g., individual delivering items to user 125) does not have to wait an extended period of time at the merchant location for the merchant 145 to prepare the order request. In other examples, the order request system 104 may determine if there are insufficient resources to complete the grocery delivery service order request. For example, insufficient resources may indicate there are no available couriers to deliver the requested grocery items. In some examples, the order request system 104 may reject a grocery delivery service order request if there are insufficient resources (e.g., shoppers 135, couriers, etc.) to complete the grocery delivery order request. In other examples, the order request system 104 may offer alternative solutions (e.g., a later time or day) if there are insufficient resources to complete the grocery delivery order request.

In some examples, the order request system 104 may provide data indicative of the grocery delivery service request to other systems and components of the network system 101 for further processing or storage. For instance, the order request system 104 may provide data indicative of the grocery delivery service request to the data repository 105. The data repository 105 may include, for example, data stores such as relational databases, non-relational databases, key-value stores, full-text search engines, message queues, etc.

The data repository 105 may include user data 106, historical data 108, and merchant data 110. Such data may be encrypted, stored in a secure manner, pseudonymized, or optionally collected (e.g., as selected by the user 125). In some examples, the data repository 105 may be replicated to ensure the data stored in the data repository 105 is readily available for the plurality of user devices 121, shopper devices 131 and the merchant systems 146.

User data 106 may include data associated with the users 125 of the grocery delivery service entity. In some examples, the user data 106 may include user profile information (e.g., name, address, payment information) and user preferences (e.g., essential grocery items, replacement grocery items, etc.) of the users 125. In other examples, user data 106 may include geographical information regarding the current location of the user device 121 associated with the user 125. For example, a user 125 may be on vacation and may be located in a different geographical location than the address associated with the user 125. For instance, the user 125 may consent to providing user data 106 including the current geographical location of the user device 121 associated with the user 125.

Historical data 108 may include historical information associated with the users 125. For example, historical data 108 may include a previous grocery delivery service order requests (e.g., order history) that indicate items, merchant locations, and feedback from a user 125. In some examples historical data 108 may be specific to a user 125 (e.g., order history of a specific user 125). In other examples, historical data 108 may be an aggregate of historical information for a plurality of users 125 in a geographic region. Historical data 108 may be any relevant historical information associated with the usage of the grocery delivery service entity by the user 125.

Historical data 108 may include historical information associated with merchants 145. For example, historical data 108 may include the history of the availability of specific grocery items at a merchant location, historical inventory trends (e.g., restocking times, low stock trends, etc.), completion time to prepare an order (e.g., shoppers 135 associated with the merchant location), etc. In some examples, historical data 108 may be specific to a merchant 145 (e.g., grocery store chain) or merchant locations associated with the merchant 145 (e.g., a specific merchant location of a plurality of merchant locations). In some examples, historical data 108 may include the previous locations of grocery items within a merchant locations. For example, a merchant location may update or change the layout (e.g., map) of the merchant location. In some examples, historical data 108 may include the historical map data for merchant locations. In other examples, historical data 108 may be an aggregate of historical information for all merchants 145 and merchant locations in a geographic region.

In some examples, the data repository 105 may be updated by the user devices 121, the shopper devices 131, and the merchant systems 146. For example, as the user 125 submits, via the application 122 running on the user device 121, a grocery delivery service order request, the data repository 105 may be updated to reflect the grocery delivery service order request. In some examples, the shopper device 131 may update, via the application 132 running on the shopper device 131, the data repository 105 by providing updates (e.g., item unavailable, shopping complete, etc.) associated with the delivery service order request. In other examples, the merchant systems 146 may update the data repository 105 to reflect changes such as inventory levels at merchant locations, operating hours of the merchant locations, etc. The data repository 105 may be updated dynamically (e.g., as events occur) or may be updated on a scheduled reoccurring basis.

In some examples, one or more machine-learned models 107 may utilize the data stored in the data repository 105. By way of example, the one or more models 107 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

For example, the one or more models 107 may include a machine-learned orchestration model trained process request data (e.g., user data 106 including user preferences, order request, etc.), map data (e.g., merchant data 110 including the store layout, location of grocery items relative to the layout, etc.), and data signals from computing devices within the merchant to generate output indicative of one or more routes that leads the shopper 135 to each requested grocery item within the merchant location. Data signals may include any pulse, frequency, electromagnetic, or electrical current that carries data from one system or network to another. In some examples, data signals may be generated from computing devices (e.g., mobile computing devices) located within the merchant location. Data signals can be communicated directly between devices. In some implementations, data signals can be communicated indirectly, through an intermediate system. For instance, multiple shoppers 135 located in the same merchant location may generate and transmit data signals to the network system 101 indicating contextual information associated with the merchant location. In some examples, data signals may indicate an updated location of a requested item, the availability (e.g., in stock, out of stock, etc.,) of a requested item, a level of activity within the merchant location, and the like.

In some examples, data signals may indicate an approximate location of the shopper 135 based on a time one or more items were scanned. For instance, two items scanned within a few seconds of each other may indicate the shopper 135 is in a particular aisle within the merchant location. Based on the data signals indicating an approximate location, the one or more models 107 may generate output indicative of one or more routes that leads the shopper 135 to the other items. An example of data signals within a merchant location is further described with reference to FIG. 7.

In some examples, the one or more models 107 may include a machine-learned route generator trained to generate one or more route segments based on the orchestration model output. For instance, the route generator may utilize the processed request data, map data, and data signals to generate one or more route segments that lead the shopper 135 to each requested item within the merchant location. In some examples, the route generator may output command instructions to generate a user interface of the shopper device 131 that iteratively displays each route segment. In some examples, the route generator may output command instructions that generate a user interface of the shopper device 131 that displays an aggregate shopper route including all of the one or more route segments.

In other examples, the route generator may be trained to generate one or more replacement item route segments based on user preferences (e.g., user data 106) that indicate replacement items for unavailable requested items. For example, the user 125 may indicate a replacement item that should be selected in the event a requested item is unavailable (e.g., out of stock). In some examples, the user preference for replacement items may be included in request data and utilized by the machine-learned route generator to generate a replacement route segment in the event that a requested item is unavailable. In some examples, the route generator may output command instructions that generate a user interface of the shopper device 131 that displays the replacement route segment. In other examples, the route generator may output command instructions that generate a user interface of the shopper device 131 that displays an updated aggregate shopper route including an updated replacement route segment. An example of the machine-learned orchestration and route generator models is further described with reference to FIG. 5.

As indicated, the system 100 may include various users 125 and user devices 125. The users 125 may include individuals, or a group of individuals associated with a user profile configured to interact with the grocery delivery service entity. In some examples, the users 125 may utilize a guest profile (e.g., one time use) to interact with the grocery delivery service entity. The user device 121 may include a mobile computing device, such as a smartphone, tablet computer, laptop computer, VR or AR headset device, and the like. As such, the user device 121 may include components such as a microphone, a camera, a satellite receiver, and a communication interface to communicate with external entities using any number of wireless communication protocols. In some examples, the user device 121 may store a designated service application (e.g., application 122) in a local memory. In some examples, the memory may store additional applications executable by one or more processors of the user device 121, enabling access and interaction with one or more host servers over one or more networks. In some examples, user devices 121 may communicate with the network system 101 over one or more networks.

The user device 121 may be associated with the user 125 and allow the user 125 to interact with the grocery delivery service entity (e.g., network system 101). For example, in response to user input by the user 125, the application 122 may interact with the user device 121 to display an application interface on a user interface of the user device 121. In some examples, the user 125 may select items (e.g., via a touch or cursor user input) and submit a grocery delivery service order request through the application 122 running on user device 121. In some examples, the user 125 may view order updates (e.g., order in progress, complete, unavailable items, etc.) on the user interface of the user device. In some examples, the user 125 may view an ETA (estimated time of arrival) for the order request.

In some examples, the user device 121 may receive data from the network system 101. For example, the application 122 may receive data stored in the data repository 105 of the network system 101. In some examples, the application 122 may interact with the user device 121 to display the historical data 108 associated with the user 125 (e.g., a user's order history). In some examples, the application 122 may interact with the user device 121 to display merchant data 110 (e.g., available grocery items at a merchant location). In other examples, the application 122 may interact with the user device 121 to display user data 106 including user preference selections, related grocery items, and suggestions for grocery items that are likely to be desired by the user 125.

In some examples, the user device 121 may transmit user data 106 to the network system including user preference selections. For example, a user 125 may indicate preferences for requested items. User preference selections may include replacement grocery items (e.g., replace an unavailable item), priority grocery items (e.g., required grocery items to complete the order request), grocery items of a preferred ripeness (e.g., ripeness level), etc. For example, a user 125 may indicate user preference selections indicating organic whole milk as a suitable replacement item for 2% milk.

By way of example, a user 125 may indicate that eggs are an item in an order request that must be fulfilled. The order request may include other breakfast foods such as waffles, or bacon. As such, such a priority item may indicate that the entire order request should be cancelled if eggs are unavailable. The user 125 may also indicate a user preference selection indicating that grocery items meet a preferred ripeness or fattiness level. For instance, the user 125 may indicate that bananas selected from a plurality of bananas should be underripe and indicate that steak meet a specified fatty composition (e.g., fattiness level) to be selected from one or more available steaks at the merchant location.

In some examples, priority grocery items may be indicated based on the type of grocery item. For instance, temperature considerations may cause an item to be designated as a priority item. By way of example a user 125 may request ice cream. Due to ice cream needing to maintain a cool temperature, the ice cream item may be designated as priority item which may need to be shopped last (e.g., to maintain cool temperature). In another example, a user 125 may request a rotisserie chicken item. Due to the rotisserie chicken item needing to maintain a hot or warm temperature, the item may be designated as a priority and may need to be shopped last.

In some examples, the user device 122 may receive data from the network system 101 including related grocery items and suggestions for grocery items. Related grocery items may include items that are generally related to items included in the order request. For example, a related item for a steak grocery item added to the order request may be potatoes. Suggestions for grocery items may include suggestions based on previous order requests. For instance, suggestions for grocery items may include one or more items that have previously been included in an order request with an item included in the current order request. In some examples, suggestions for grocery items and replacement items may include one or more items from previous order requests for the requesting user 125. In other examples, suggestions for grocery items and replacement items may include one or more items from previous order requests from an aggregate of users 125. In some implementations, this type of information may be included in user data 106.

In some examples, the one or more models 107 may determine the user preference selections, the related grocery items, the suggested grocery items, and replacement items. For example, the one or more models 107 may include a user preference model trained to determine replacement item preferences of a user 125. For instance, the user preference model may utilize historical data 108 and merchant data 110 to determine the suggested replacement grocery item. For example, the user preference model may determine, based on historical data 108 and merchant data 110, that a selected grocery item is typically unavailable at the merchant location. In some examples, the user preference model may determine a suggested grocery item to replace a grocery item that has a high likelihood of being unavailable at the merchant location. In other examples, the user preference model may determine a replacement item based on user data 106 indicating that an item is a priority item, historical data 108 indicating the item is typically unavailable, and historical data indicating the user 125 has identified a suitable replacement item in a previous order request. An example user interface indicating suggested grocery items, related grocery items, and replacement items is further described with reference to FIG. 3.

In some examples, the user preference model may be trained to determine priority items for a user 125. These types of items may include items that the user 125 indicates are required for the order request to be completed. For instance, an order request that includes cereal and other non-priority items may be cancelled if cereal is unavailable at the merchant location. In some examples, the user preference model may utilize user data 106 including user preference selections by the user 125, historical data 108 including an order history of the user 125, and merchant data 110 to determine priority items. For instance, the user preference model may determine that eggs are a priority grocery item based on the order history of the user 125 that indicates the user has cancelled grocery delivery order requests where eggs were unavailable at the merchant location. An example user interface indicating priority items is further described with reference to FIG. 3.

In some examples, the user device 121 may transmit user preference selections (e.g., user data 106) to the network system 101. For example, the application 122 may interact with the user interface of the user device 121 to display selectable options for the user 125. For example, the application 122 may interact with the user device 121 to display user preference options. In some examples, the user 125 may indicate a preference that requested items are priority by interacting with (e.g., adjusting, sliding, swiping, typing, etc.) an interactive priority user interface element (e.g., button, menu) on the display of the user device 121. In some examples, the user 125 may indicate (e.g., prior to submitting an order request) that user preferences should be used for all future order requests. For example, the user 125 may indicate (e.g., prior to submitting an order request) that user preferences should only be used for a current order request. For instance, the application 122 may interact with the user device 121 to display user preference options and the user 125 may select a user interface element to indicate that user preference selections are only for the current order request. In other examples, the user 125 may opt to not save the user preference selections.

In other examples, the user 125 may update previously saved user preferences. For example, the application 122 may interact with the user interface of the user device 121 to display saved user preference options. The user 125 may indicate updated user preferences by updating an item preference user interface element. For example, the user 125 may indicate an updated user preference to replace organic whole milk with non-organic whole milk by interacting with (e.g., adjusting, sliding, swiping, typing, etc.) an interactive replacement item user interface element (e.g., button, menu) on the display of the user device 121.

In some examples, user data 106 may include user preferences. The user preference selections may be transmitted over one or more networks and stored in a data repository 105 of the network system 101. In some examples, the user preference selections may be used as input data to the one or more models 107 of the network system 101.

The system 100 may include shoppers 135 and shopper devices 135. A shopper 135 may be used to retrieve requested grocery items from a merchant location. In some examples, the shopper 135 may include the courier (e.g., individual transporting requested grocery items), or an individual associated with the merchant 145 (e.g., a designated shopper at a merchant location). The shopper device 131 may include a mobile computing device, such as a smartphone, tablet computer, laptop computer, VR or AR headset device, and the like. As such, the shopper device 131 may include features such as a microphone, a camera, a satellite receiver, and a communication interface to communicate with external entities using any number of wireless communication protocols.

In some implementations, the shopper device 131 may be a courier device via which a courier receives data associated with the delivery service order request. This may include instructions for traveling to a merchant location associated with one or more merchants 145, items selected by a user 125, etc.

In some implementations, the shopper device 131 may be a mobile computing device associated with a merchant location. This may include a dedicated tablet, phone, etc. that is utilized by a shopper 135 within the merchant location. The shopper device 131 may receive, for a merchant 145, data that is associated with the delivery service order request. This may include items selected by a user 125, pick-up times, etc. In some implementations, a shopper device 131 may be communicatively connected to a computing system of the merchant location (e.g., inventory systems, POS systems, etc.).

In some examples, the shopper device 131 may store a designated service application (e.g., application 132) in a local memory. In some examples, the memory may store additional applications executable by one or more processors of the shopper device 131, enabling access and interaction with one or more host servers over one or more networks. In some examples, shopper devices 131 may communicate with the network system 101 over one or more networks.

Shopper devices 131 may be associated with shoppers 135 and allow the shopper 135 to interact with the grocery delivery service entity. For example, in response to user input by a shopper 135, an application 132 may interact with the shopper device 131 to display an application interface on a user interface of the shopper device 131. An example user interface of a shopper device is further described with reference to FIGS. 4A-C.

In some examples, the shopper device 131 may receive, over one or more networks, data from the network system 101. For example, the application 132 may receive data stored in the data repository 105. In some examples, the application 132 may interact with the shopper device 131 to display merchant data 110 (e.g., map data, merchant location, item locations within merchant location relative to map data, etc.). In other examples, the application 132 may interact with the shopper device 131 to display user data 106 (e.g., user preferences, priority items, etc.). An example user interface of a shopper device is further described with reference to FIGS. 4A-C.

In some examples, the shopper device 131 may receive output from the one or more models 107 of the network system. For example, the one or more models 107 may include a machine-learned route generator trained to generate one or more route segments based on the orchestration model output. For instance, the route generator may utilize the processed request data, map data, and data signals to generate one or more route segments that lead the shopper 135 to each requested item within the merchant location. In some examples, the route generator may output and transmit command instructions to generate a user interface of the shopper device 131 that iteratively displays each route segment. In some examples, the route generator may output command instructions that generate a user interface of the shopper device 131 that displays and aggregate shopper route including all of the one or more route segments. An example user interface of a shopper device 131 including route segments is further described with reference to FIG. 8A-C.

The shopper device 135 may include one or more machine-learned models 130 configured to generate a route that leads the shopper 135 to each requested grocery item included in the delivery service order request. As examples, the one or more models 130 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the one or more models 130 may obtain user data 106 including user preferences, historical data 108 including previously requested grocery items, and merchant data 110, to generate one or more route segments that leads the shopper 135 to each requested grocery item included in the delivery service order request.

In some examples, the one or more models 130 may include a machine-learned orchestration model trained process request data (e.g., user data 106 including user preferences, order request, etc.), map data (e.g., merchant data 110 including the location of grocery items), and data signals from computing devices within the merchant to generate output indicative of one or more routes that leads the shopper 135 to each requested grocery item within the merchant location. Data signals may include any pulse, frequency, electromagnetic, or electrical current that carries data from one system or network to another. In some examples, data signals 503 may include digital signals such as Wi-Fi signals, Bluetooth signals, cellular network signals, NFC (near field communication), etc.

In some examples, data signals may be generated from computing devices (e.g., mobile computing devices) located within the merchant location. For instance, multiple shoppers 135 located in the same merchant location may generate and transmit data signals to the network system 101 indicating contextual information associated with the merchant location. In some examples, the network system 101 may transmit data signals received from other computing devices within the merchant location to the shopper device 131. In some examples, the shopper device 131 may receive the data signals directly from other computing devices located within the merchant location. In some examples, data signals may indicate an updated location of a requested item, the availability (e.g., in stock, out of stock, etc.,) of a requested item, a level of activity within the merchant location, and the like. An example of data signals within a merchant location is further described with reference to FIG. 7.

In some examples, the one or more models 130 may include a machine-learned route generator trained to generate one or more route segments based on the orchestration model output. For instance, the route generator may utilize the processed request data, map data, and data signals to generate one or more route segments that lead the shopper 135 to each requested item within the merchant location. In some examples, the route generator may output command instructions to generate a user interface of the shopper device 131 that iteratively displays each route segment. In some examples, the route generator may output command instructions that generate a user interface of the shopper device 131 that displays and aggregate shopper route including all of the one or more route segments.

In some examples, the shopper device 131 may transmit data to the network system 101. For example, the application 132 may interact with the user interface of the shopper device 131 to display the requested grocery items, user preference selections of the user 125 (e.g., priority items, ripeness level, etc.), and one or more route segments that leads the shopper 135 to each of the requested grocery items. In some examples, the shopper device 135 may indicate that a requested grocery item is a priority item and indicate that the grocery item should be selected first to determine whether the order request should be cancelled. In some examples the requested grocery item may be designated as a priority item (e.g., based on temperature considerations, etc.). In some examples, the shopper device 131 may follow the route segment to the first item and select (e.g., shop) or disregard (e.g., indicate item is unavailable) the requested item. In some examples, the shopper device 131 may receive user input of the shopper 135 and transmit output indicative of status (e.g., selected or disregarded) of the grocery item to the network system 101 where the output may be stored in the data repository 105 of the network system 101.

In some examples, the output indicative of the status of the grocery item may include a data signal indicating that the grocery item is in a different location from the location indicated by the route segment. For instance, the user interface of the shopper device 131 may display an interactive user interface element that allows the shopper 135 to indicate the item cannot be found at the initial location or the item was found at another location by selecting (e.g., clicking) a button, providing text via a rich text field, etc. In some examples, the status of the grocery item may include a data signal indicating that there is a high activity level in an area proximate to the grocery item. For instance, a shopper 135 may encounter a long line at a butcher counter to select fresh meat for the order request. In other examples, the output indicative of the status of the grocery item may include a data signal indicating that the grocery item is unavailable. Example shopper user interfaces including user input from the shopper 135 are further described with reference to FIGS. 8A-C.

In some examples, the shopper device 131 may transmit data to the network system 101. For example, the application 132 may interact with the user device 121 to indicate updates associated with the order request. For example, the shopper 135 may provide updates indicating that a requested priority grocery item is unavailable (e.g., out of stock). The updates associated with the unavailable item may be transmitted over one or more networks and stored in a data repository 105 of the network system 101. In some examples, the updates may be used by the one or more models 107 of the network system 101 output command instructions to update the user interface of the shopper device 131 to cancel the order request. In some examples, the updates may be used by the one or more models 107 to output a command instruction to update the user interface of the shopper device to generate a replacement item route segment that leads the shopper 135 to a replacement item to replace the unavailable essential item.

The system 100 may include merchants 145 and merchant systems 146 that operate as an information inlet and/or outlet for the system 100 to exchange data with the network system 101. Merchants 145 may include any person or company involved in the trade or sale of items (e.g., grocery items). Merchants 145 may be associated with merchant locations (e.g., physical locations, grocery stores, etc.) where grocery items may be purchased. Example merchant locations include conventional supermarkets, limited assortment supermarkets, supercenters, warehouse clubs, or convenient stores. In some examples, merchants 145 may be associated with shopper devices 131. For example, merchants 145 may offer shopper services (e.g., a designated shopper at a merchant location) to select grocery items requested using the grocery delivery service entity. In some examples, merchants 145 associated with a shopper device 131 may perform similar operations as a shopper 135 as described herein.

Merchant systems 146 may be associated with one or more merchants 145. Merchant systems 146 may include a record for each merchant 145 subscribed to the grocery delivery service entity as well as associated merchant locations. By way of example, the merchant systems 146 may aggregate inventory data for each respective merchant location to define grocery items that are available at each merchant location associated with the respective merchants 145. In some examples, merchant systems 146 may include map data indicative of a layout of the merchant location. For example, map data may include a 2D or 3D representation of the merchant location. In some examples, map data may include location identifiers such as sections, shelves, and aisles located in the merchant location. An example of map data is further described with reference to FIGS. 6A-B.

In some examples, the merchant systems 146 may include the location (e.g., shelf, aisle number, section of store, etc.) of grocery items that are available within each specific merchant location. The merchant systems 146 may be updated by the merchants 145 to reflect the most up to date inventory levels at the respective merchant locations associated with the merchants 145. In some examples, the merchant systems 146 may synchronize within inventory management software, point-of-sale systems, etc. of one or more merchants 145 to maintain accurate levels of inventory at each respective merchant location.

In some examples, merchant systems 146 may transmit merchant data 110 to the network system 101. For example, a merchant system 146 may be updated (e.g., by an individual associated with the merchant 145, automatically, etc.) to indicate that a particular item is no longer available at a merchant location associated with the merchant 145. In some examples, a merchant system 146 may be updated to indicate that previously unavailable grocery items are now available at a merchant location associated with the merchant 145. The merchant system 146 may transmit the updated merchant data 110 indicating the change in inventory to the network system 101. In some examples, the merchant system 146 may transmit updated map data indicating an updated layout of the merchant location. In some examples, the network system 101 may utilize the updated merchant data 110 for processing order requests from users 125 of the grocery delivery service entity.

As described herein, the network system 101 may include a data repository 105. An example of a data structure that may be stored in or associated with the data repository 105 is described with reference to FIG. 2.

FIG. 2 depicts an example data structure of a memory according to example embodiments of the present disclosure. Example data may include request identifiers 205, user preferences 210, candidate couriers 215, drop-off location 220, or merchant data 225. Merchant data 225 may include data associated with one or more merchants 145. In some examples, merchant data 225 may be stored as merchant data 110 within the data repository 105 of the network system.

Request identifiers 205 may be an identifier associated with the grocery delivery service request. For example, request identifiers 205 may be associated with a specific order request. An order request may include a plurality of requested grocery items. For instance, the network system 101 may obtain data indicative of an order request including a request for at least a first grocery item (e.g., item identifier bananas) and a second grocery item (e.g., item identifier oranges) to be transported to a destination location (e.g., drop-off location 220). A request identifier can be assigned by the order request system 104 of network system 101 to the order request and item identifiers can be assigned therein (e.g., using look-up tables, etc.).

In some examples, request identifiers 205 may be systematically assigned using alpha numerical generators that assign request identifiers 205 to the order request. In some examples, the order request system 104 may generate the request identifiers 205 upon receiving the order request for the user device 121. In some examples, the request identifiers 205 may indicate an order in which the order requests were received by the order request subsystem 104. For instance, request identifiers 205 including lower integers may be generated and assigned to order requests received before request identifiers 205 including higher integers. In other examples, the request identifiers 205 may indicate a total count of order received by the order request system 104.

User preferences 210 may include preferences associated with the user 125 indicative of priority items, replacement items, the ripeness (e.g., of produce), the fattiness (e.g., of meats, dairy), expiration dates, origin (e.g., Ecuadorian coffee or produce), color, or any other data associated with a user preference (e.g., as depicted in 210A-D). The user preferences 210 may be accessed based on metadata included in the order request such as an encrypted identifier associated with the user 125 that allows the operations computing system 103 to access data for the particular user 125 (e.g., from stored user profile). In some examples, user preferences 210 may be generated by the one or more models 107 of the network system 101 based on data stored in the data repository 105. In some examples, user preferences 210 may be generated by the user 125 via the user device 121 when the user is creating the order request. An example of user preferences 210 being selected via user device 121 is further described with reference to FIG. 3.

Candidate couriers 215 may include data indicative of a plurality of candidate couriers available to facilitate completion of one or more current or future grocery delivery service requests. For instance, candidate couriers 215 may include data associated with a current number of active couriers within a geographic area. In some examples, active couriers may be determined by determining the application 132 of a courier device (e.g., shopper device 131) indicates an active state. Candidate couriers 215 may include information about each respective courier. For instance, candidate couriers 215 may include data indicative of preferences of respective couriers, location of respective couriers, etc. In some examples, candidate couriers 215 may include shoppers 135. In some examples, the shopper 135 and candidate courier 215 may be separate individuals. For example, a designated shopper 135 at a merchant location where the requested grocery items are located may retrieve the requested grocery items, and a candidate courier 215 may transport the retrieved grocery items to a drop-off location 220. The drop-off location 220 may include data indicative of a destination location for the requested grocery items associated with the grocery delivery service order request to be dropped off by one or more couriers.

By way of example, a current number of active couriers within a geographic area may be compared to a threshold number of active couriers within a geographic area. For instance, a threshold number of active couriers may be indicative of a number of couriers being active in a geographic area to adequately perform a plurality of current or predicted future vehicle service requests. A number of active couriers that exceeds the threshold number of active couriers may be indicative of a surplus of available couriers to perform expected vehicle service requests within the geographic region. A number of active couriers that does not exceed the threshold number of active couriers may be indicative of an undersupply (e.g., insufficient resources) of active couriers in a geographic area to perform expected grocery service delivery requests within the geographic region.

Merchant data 225 may include data associated with a plurality of merchants (e.g., merchants 145). For instance, merchant data 225 may include a location 235 of a merchant 145, inventory 240 of grocery items offered by the merchant 145, hours 245 of operation of the merchant 145, an estimated time to pack 250 grocery items at the merchant location or other information. Location data 235 may include data indicative of a location of the merchant (e.g., geographic location, GPS coordinates, latitude and longitude). Inventory data 240 may include a listing of item identifiers (e.g., item ids 260), the quantity 244 of grocery items, the section 242 of the merchant location where the items may be located (e.g., as depicted in 240A-D), the aisle 243 where the items may be located, and the user preference selections 246 associated with each item id 260 (e.g., as depicted in 210A-D). In some examples, inventory data 240 may be associated with map data. For example, map data may include associated aisles 243 and sections 242. An example of map data associated with inventory data is further described with reference to FIGS. 6A-B.

Estimated time to pack 250 may include an average time it takes to pack the grocery item (e.g., for a shopper 135, merchant 146, or courier to obtain the item and check out at a merchant location). Estimated time to pack 250 may include a time to physically find an item. Estimated time to pack 250 may vary for item ids 260 based on each merchant 145. For instance, in some merchant locations, produce may be located right near the entrance, whereas in alternative merchant locations, produce is located in the back of the store. Thus, the estimated time to pack 250 may be indicative of an average time to pack determined by the computing system (e.g., system 100, network system 101, or operations computing system 103).

Upon receiving an order request, the network system 101 may concatenate the data stored in memory 200. For instance, user preferences 210 may be concatenated to correlate item id 260 of requested grocery items with the section 242, aisle 243, a quantity 244 of each item and the user preferences selections 246. The item ids 241 may include the name of the requested grocery item. The section 242 may include a section or region (e.g., relative to the map) of the merchant location that stores similar grocery items (e.g., produce section stores fruits and vegetables). The aisle 243 may include specific aisle numbers, shelf numbers, and positions on a specific shelf of an aisle that stores the item id (e.g., item). The quantity 244 may include an integer totaling the number of available items matching the item id 241 at the merchant location. The user preferences selections 246 may include an integer, fraction, percentage, or any other identifier on a pre-determined scale to indicate a ripeness or fattiness preference of the user 125.

In some examples, the user preference selections 246 may include text strings that indicate whether the associated item id 241 is a priority item (e.g., 210B). In other examples, the user preference selections 246 may include text strings that indicate the associated item ids 241 has an associated replacement item (e.g., 210C) selected by the user 125. For instance, a user preference 246 that indicates the replacement item (e.g., 210C) may concatenate a child item id via a lookup table of the merchant data 225. For instance, the item id 241 for chicken nuggets may include a user preference selection 246 indicating a replacement item 210. The item replacement item 210C may concatenate a second item id by generating a parent-child relationship with the item id 241 for chicken nuggets. In some examples, the item id 241 for chicken nuggets may be updated by the second item id (e.g., child item id) if the item id 241 for chicken nuggets has a quantity of zero or the shopper 135 indicates the item id 241 for chicken nuggets is unavailable.

As depicted in FIG. 2, a user 125 may submit an order request for bananas, oranges, chicken nuggets, and milk. The bananas, oranges, chicken nuggets, and milk may each include an item id 241 indicating the name of each respective item. The item id 241 may be associated with a merchant 145 that includes sufficient inventory 240 of item ids 241 that match bananas, oranges, chicken nuggets, and milk. The item id 241 may be associated with the section 242, aisle 243, a quantity 244 of each item and the user preferences selections 246. In an example, the network system 101 may determine that a first item and second item (e.g., item id banana based on quantity 244A, or item id oranges based on quantity 244B) is available at a merchant location (e.g., merchant 145). In some examples, the network system 101 may determine that a third item (e.g., item id chicken nuggets based on quantity 244C) has low stock and a fourth item (e.g., item id milk based on inventory 244D) is unavailable (e.g., out of stock) at a merchant location (e.g., merchant 145).

The network system 101 may concatenate the user's 125 user preferences selection 246 for each of the item ids 241. For example, a user 125 may indicate a ripeness of bananas 210A, priority item 210B for oranges, and replacement item 210C for chicken nuggets. In some examples, a user 125 may not indicate a user preferences selection 246 for a requested item. For example, the user preferences selection 246 may indicate a null value (e.g., no user preferences are applicable, 210D) for the item id milk. In some examples, where a user 125 does not indicate a user preferences selection 246, the shopper 135 may select any of the available grocery items (of that type) at the merchant location. In other examples, whether the user does not indicate a user preference selection 246 for an item and the item is unavailable, the shopper 135 may disregard (e.g., indicate the item is unavailable) without selecting a replacement item. In some examples, the user 125 may indicate a user preferences selection 246 for future order requests. In other examples, the network system 101 may suggest, using models 107 a user preferences selection 246. For instance, the one or more models 107 may determine a suggested user preferences selection 246 based on feedback from the user 125 from pervious order requests. Example determination of suggested user preference selections 246 is further described with reference to FIG. 3.

Figure 3:
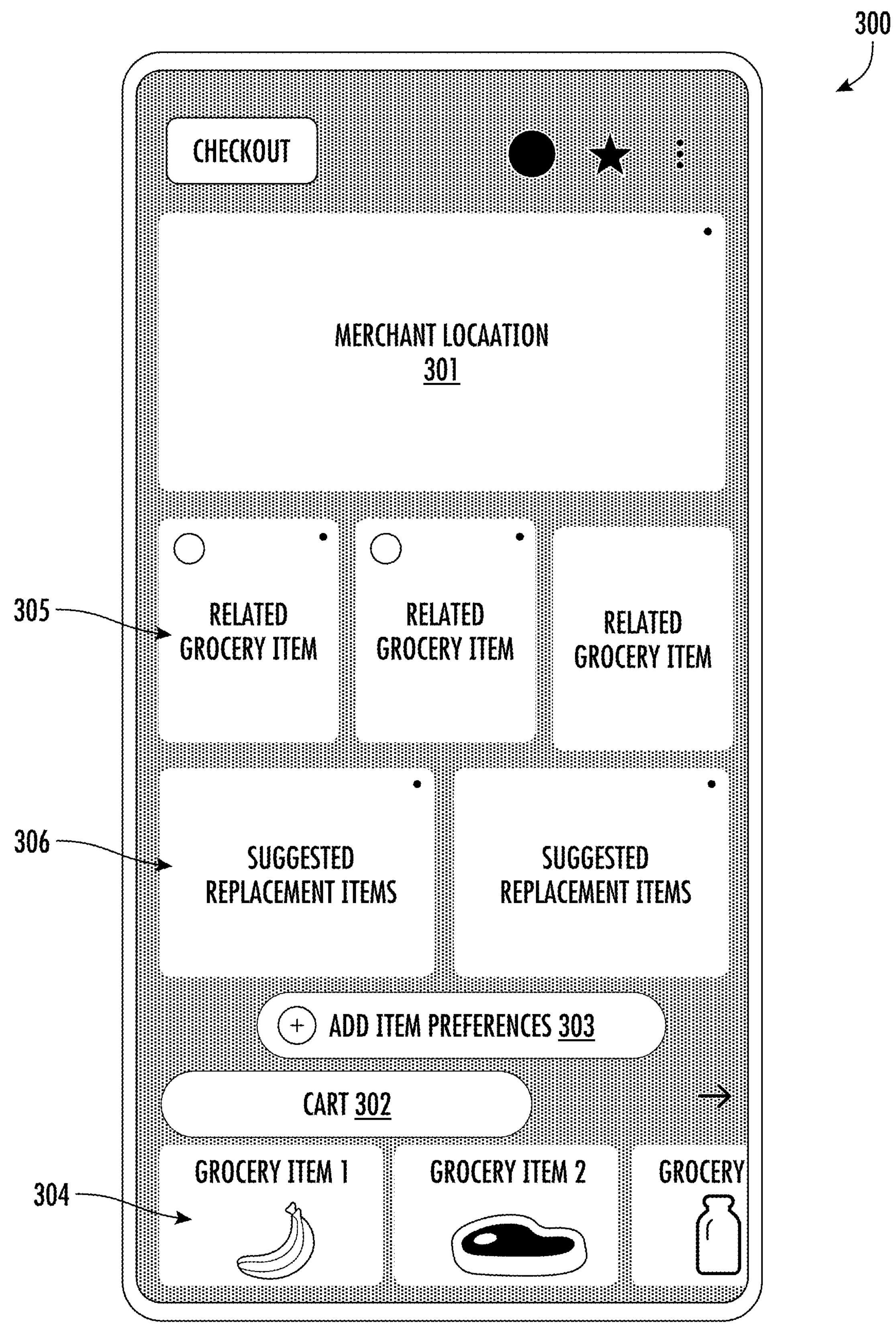
FIG. 3 depicts an example user interface according to example aspects of the present disclosure.

FIG. 3 depicts an example user interface according to example aspects of the present disclosure. By way of example, the user interface 300 may be a user interface of the user device 121 associated with the user 125 to allow the user 125 to interact with a grocery delivery service entity. For example, the application 122 may interact with the user device 121 to display on the user interface 300 an application interface. The application 122 may cause the user interface 300 to render the user interface 300 via a display device (e.g., screen).

In some examples, the user interface 300 may include one or more interactive user interface elements. The user interface elements may be selectable, adjustable, or otherwise interactive. For instance, interaction with the user interface elements may allow a user 125 to submit an order request for grocery items as well as submit other related information. By way example, the user interface 300 may include one or more merchant location elements 301, cart elements 302, add item preference elements 303, grocery item elements 304, related grocery item elements 305, and suggested replacement item elements 306. The interactive user interface elements may each be selectable, adjustable, or interactive. Example types of interactive elements may include soft buttons, menus, checkboxes, sliders, etc.

The merchant location element 301 may include a user interface element that allows a requesting user (e.g., user 125) to select one or more merchant locations where grocery items are available. For example, a requesting user 125 may search for milk and select a merchant location 301 that has milk available. In some examples, the merchant location 301 may indicate a plurality of merchant locations 301. For example, a requesting user 125 may search for bananas and steak and select a first merchant location 301 that includes steak and a second merchant location 301 that includes bananas. In some examples, a requesting user 125 may search for a specific merchant location 301 and interact with the grocery items element 304 to add grocery items to the cart 302 that are available at the specific merchant location 301. In some examples, the merchant location 301 may include merchant locations 301 that are in a relative geographic vicinity to the requesting user 125. For instance, the user 125 may consent to share the current location of the user device 121 and the merchant locations 301 may be updated to reflect merchant locations in close proximity to the user device 121.

The cart element 302 may include a user interface element that allows a user 125 to identify items that have been added to the order request. For example, as depicted in example user interface 300, the cart element 302 may include one or more grocery item user interface elements 303 such as bananas, meat, and milk that have been added to the order request (e.g., cart 302). In some examples, the cart 302 may be an interactive user interface element. For example, a requesting user 125 may interact with the cart 302 to remove one or more grocery items (e.g., depicted within the grocery item elements 304) that have been added to the order request. In some examples, the cart 302 may display one or more grocery item elements 304 to be ordered by the requesting user 125 at a later time. In some examples, the cart 302 may be automatically updated to reflect changes in the availability of grocery items. For example, the grocery items element 304 may be updated to reflect out of stock grocery items. For instance, a requesting user 125 may add a banana grocery item to the cart 302. In some examples, the user device 121 may determine that the banana grocery item is no longer available (e.g., out of stock) at a merchant location 301 and automatically update the cart 302 element to reflect the change in availability. For instance, the merchant system 146 may provide updated merchant data 110 to the network system 101 indicating that bananas are unavailable (e.g., out of stock) at the merchant location. In other examples, the cart 302 (or another portion of the user interface 300) may indicate that unavailable grocery items at a first merchant location are available at a second merchant location. For example, the merchant location element 301, grocery item element 304, or the cart 302 may be updated to reflect the alternative merchant location of the grocery items included in the cart 302.

The user interface 300 may display one or more related grocery item elements 305 based on the items present in the cart 302. For example, as depicted in example user interface 300 a user 125 may add a meat grocery item to the cart 302. In some examples, the user interface 300 may display a related grocery item element 305 indicating related grocery items such as potatoes based on the meat grocery items in the cart 302. For instance, a related grocery item 305 may complement the grocery items in the cart 302.

In some examples, the one or more models 107 of the network system 101 may be used to determine related grocery items 306 based grocery items present in the cart 302. For example, the one or more models 107 may utilize user data 106, historical data 108, and merchant data 110 of the network system 101 to determine the relationship of grocery items in the cart 302 to a related grocery item 305. In other examples, historical data 108 of the network system 101 may be used to determine related grocery items 305 based on grocery items present in the cart 302. For example, historical data 108 may indicate that one or more requesting users 125 have added the related grocery item 305 to the cart 302 after adding specific grocery items to the cart 302 in previous order requests. Related grocery items 305 may be based on other inputs such as historical trends (e.g., items commonly purchased together), the geographic region of the merchant location 301 or requesting user 125, or any other factors.

In some implementations, the user interface 300 may display an option to add item preferences to one or more grocery items in the cart 302. The add item preferences element 303 may include one or more user preference selections 246 for selected grocery items for the requesting user 125. The user 125 may interact (e.g., click) with the add item preferences element 303 to provide user input indicative of user preference selections 246. For example, the add item preferences element 303 may indicate preferences associated with the user 125 including priority items, replacement items, the ripeness (e.g., of produce), the fattiness (e.g., of meats, dairy), expiration dates, origin (e.g., Ecuadorian coffee or produce), color, or any other data associated with a user preference. For instance, a user 125 may add a banana grocery item and a meat grocery item to the cart 302 and interact with the add item preferences element 303 to provide user preference selections 246 (e.g., a ripeness level, suitable replacements, priority items, etc.) for the banana grocery item and the meat grocery item. For example, the application 122 may cause the user interface 300 to render the user interface to display an interactive slider user interface element. The interactive slider user interface element may allow the user 125 to slide a slider on a slider scale to indicate a user preference (e.g., level of ripeness) for a grocery item. In some examples, the interactive user interface element may include a include soft buttons, menus, checkboxes that captures the replacement items and essential item preferences of the user 125. The input provided by the user 125 may be stored as user preference selections 246 and utilized by the network system 101 or shopper device 131.

In some examples, add item preferences element 303 may be selected only for a current order request. For example, a user 125 may add grocery items to the cart 302 and indicate a one-time user preference selection 246 by selecting the add item preferences element 303 and indicating the item preference is only to be used one time for the current order request (e.g., single use user preference selections 246). In some examples, add item preferences 303 may be preselected and saved by the requesting user 125 for future orders. For instance, a user 125 may add grocery items to the cart 302 and indicate permanent item preferences by selecting the add item preferences element 303 and interacting (e.g., click) with a save user interface element to save the preferences. In some examples, the saved preferences are stored as user preference selections 246. By way of example, saved item preferences may indicate that each time a steak grocery item is added to the cart 302, the user preference selections 246 for steak should apply. In some examples, user preference selections 246 may be stored within the user data 106 and may be transmitted to the data repository 105 of the network system 101. In some examples, the user preference selections 246 may be stored within the computing device memory 200. In other examples, the user preference selections 246 may be transmitted from the data repository 105 of the network system 101 to a shopper device 131. For instance, a shopper 135 may access the user preference selections 246 captured by the add user preferences element 303 from the user 125 to determine priority items, generate one or more prioritized route segments that lead to priority items before non-priority items, and determine replacement items associated with replacement item route segments based on the user preference selections 246. An example, user interface of a shopper device including user preference selections 246 is further described with reference to FIGS. 4A-C.

User preference selections 246 captured by the add user preferences element 303 may be used by the computing system 100 to generate a route that leads the shopper 135 to each requested grocery item included in the delivery service order request. For example, user preference selections 246 may be included in user data 106. A shopper device (e.g., shopper device 131) may access user data 106 upon arrival at the merchant location 301. For example, the application 132 may receive data stored in the data repository 105 (e.g., based on a transmitted request, a push from the network system 101, etc.). In some examples, the application 132 may interact with the shopper device 131 to display merchant data 110 (e.g., map data of merchant location, aisles and shelves of items, etc.). In other examples, the application 132 may interact with the shopper device 131 to display user data 106 (e.g., user preference selections 246, priority items, replacement items, etc.). In some examples, item preferences may be used to ensure that a shopper 135 navigates to priority items indicated by the user preference selections 246 first to ensure that the order request should not be cancelled due to a priority item being unavailable. For instance, the application 132 may interact with the shopper device 131 to display one or more route segments that leads the shopper to all requested items. In some examples, the route segments may be prioritized and displayed in a manner that ensures priority items will be selected (e.g., "shopped") first. An example, user interface of a shopper device including user preference selections 246 is further described with reference to FIGS. 4A-C.

The user interface 300 may display one or more suggested replacement item elements 306 based on the grocery items in the cart 302. The suggested replacement item preferences element 306 may include one or more suggested replacement item user preference selections 246 of selected grocery items for the user 125. For instance, the suggested replacement item element 306 may include suggested replacement items which are similar to the grocery items included in the cart 302 to serve as a viable substitute or replacement in the event that the grocery item included in the cart 302 is unavailable. For example, the suggested replacement item element 306 may include a suggested replacement item for a milk grocery items that has been added to the cart 302. By way of example, the suggested replacement item element 306 may include a grocery item user interface element 304 set to a suggested replacement grocery item indicating a suggested replacement item preference. In some examples, the suggested item replacement element 306 may be interactive. For example, a user 125 may interact (e.g., click) with the suggested replacement item element 306 to include the suggested replacement item as a user preference selection 246. In other examples, the user 125 may interact with the suggested item replacement element 306 may change the suggested replacement item. For instance, the suggested replacement item element 306 may include multiple suggested replacement item options (e.g., a carousel within the suggested replacement item element 306). The user 125 may interact (e.g., swipe) with the suggested replacement item element 306 to select one or more replacement items by selecting one or more options of displayed within the suggested replacement items element 306.

In some examples, the suggested replacement items element 306 may be determined by the one or more models 107 of the network system 101. For example, the network system 101 may include a user preference model trained to determine the preferences of a requesting user 125 by utilizing user preferences data 210 and historical data 110. For instance, a user 125 may indicate a single use user preference for a replacement item on a previous order request. In some examples, the one or more models 107 of the network system 101 may determine updated user preference selections 246 and update the suggested replacement item element 306 by utilizing the user data 106 including user preferences data 210 indicating the selected user preferences 246 of the previous order request from historical data 110.

The example user interface 300 may allow a requesting user 125 to submit an order request for grocery delivery services. For example, in response to user input by a user 125, the application 122 may interact with the user device 121 to display an application interface on a user interface 300 of the user device 121. The user 125 may select one or more grocery items from one or more merchant locations and add the grocery items to a cart 302. The user 125 may additionally or alternatively add one or more related grocery items 305 to the cart 302 and include one or more user preference selections 246 captured by the add user preferences element 303. In some examples, the user 125 may add or one or more replacement item user selection preferences 246 via the suggested replacement items element 306 for each of the grocery items or related grocery items 305. The user 125 may checkout and submit the order request to the grocery delivery service entity. In some examples, the grocery delivery service entity may assign a shopper 135 to select the requested grocery items from the merchant location by transmitting data indicative of the order request to an available shopper device 131 associated with a shopper (e.g., shopper 135, merchant 145). In other examples, the shopper 135 (e.g., shopper, courier) may deliver the grocery items to the requesting using 125.

Figures 4A, 4B, 4C:
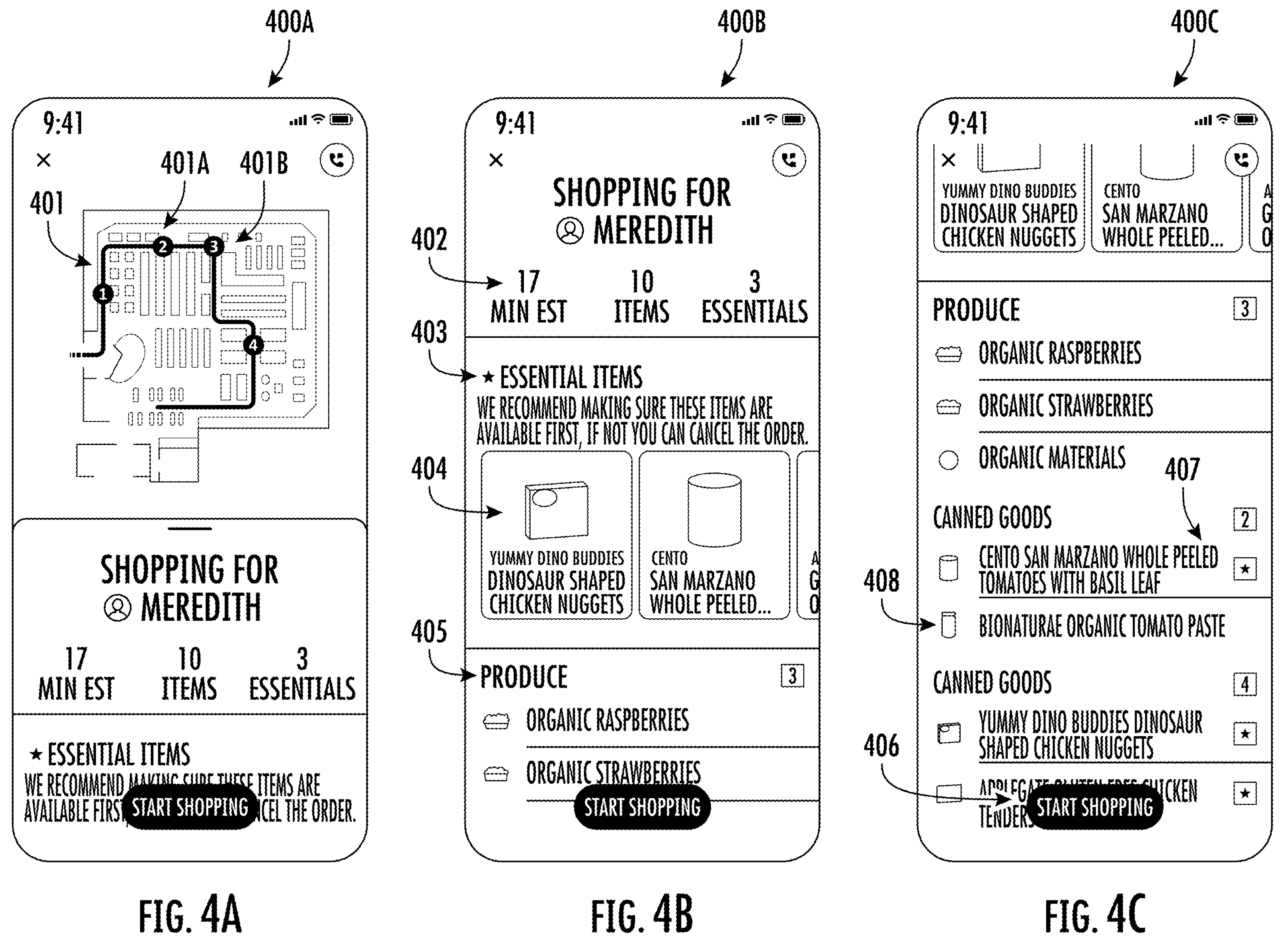
FIG. 4A-C depicts example user interfaces according to example aspects of the present disclosure.

FIG. 4A-C depicts example user interfaces according to example aspects of the present disclosure. By way of example, the example user interface 400A depicted in FIG. 4A may be a user interface of a shopper device 131 associated with a shopper 135 to allow the shopper 135 to interact with the grocery delivery service entity. For example, in response to user input by the shopper 135, the application 132 may interact with the shopper device 131 to display an application interface on the user interface 400A of the shopper device 131.

For example, as depicted in FIG. 4A, the user interface 400A of a shopper device (e.g., shopper device 131) may display an aggregated shopper route 401 including one or more route segments (e.g., route segments 401A, 401B, etc.). In some examples, the aggregated shopper route 401 may indicate a complete path of travel through the merchant location that leads the shopper 135 to each grocery item included in the order request. For example, each route segment 401A, 401B may indicate a path through the merchant location to the location of each requested grocery item. In some locations, the aggregated shopper route 401 may indicate a path of travel from the current location of the shopper device 131 (e.g., the entrance of the merchant location) to each of the requested grocery items by compiling one or more route segments (e.g., 401A, 401B) that indicate an individual path to lead the shopper 135 to respective grocery items requested by the user 125. In other examples, the aggregated shopper route 401 may indicate a path of travel from the last grocery item selected by the shopper 135 to a checkout location where the shopper 135 may purchase (e.g., checkout) the requested grocery items.

In some examples, the aggregated shopper route 401 may be based on map data. For instance, the aggregated shopper route 401 may indicate a path relative to a generated indoor map of the merchant location. A generated indoor map is further described with reference to FIG. 5. As the shopper 135 executes the aggregated shopper route 401, the aggregated shopper route 401 may correlate the shoppers position within the merchant location based comparing data signals transmitted from the shopper device 131 to a position on the indoor map of the merchant location. In some implementations, the shopper device 131 of the shopper 135 may localize itself within the merchant locations (e.g., by matching captured image data to the map data) and transmit position data of the shopper device 131 to other computing systems. An example of map data being used to generate the aggregated shopper route 401 and route segments 401A, 401B is further described with reference to FIG. 5.

In some examples, the aggregated shopper route 401 may indicate the most efficient path to each of the requested grocery items. For example, the aggregated shopper route 401 may be updated to indicate a path of travel that accommodates contextual information associated with the merchant location. For instance, the aggregated shopper route 401 may be determined by the one or more models 107 of the network system 101. For example, the one or more models 107 may include a machine-learned orchestration model trained process request data (e.g., user data 106 including user preferences, order request, etc.), map data (e.g., merchant data 110 including the location of grocery items), and data signals from computing devices within the merchant to generate output indicative of one or more routes (e.g., 401, 401A, 401B) that leads the shopper 135 to each requested grocery item within the merchant location. Data signals may include any pulse, frequency, electromagnetic, or electrical current that carries data from one system or network to another. In some examples, data signals 503 may include digital signals such as Wi-Fi signals, Bluetooth signals, cellular network signals, NFC (near field communication), etc. In some examples, data signals may be generated from computing devices (e.g., mobile computing devices) located within the merchant location. An example of the generating route segments using request data, map data and data signals is further described with reference to FIG. 5.

By way of example, multiple shoppers 135 located in the same merchant location may generate and transmit data signals to the network system 101 indicating locational characteristics of the requested item. For example, data signals may indicate an updated location of a requested item, the availability (e.g., in stock, out of stock, etc.,) of a requested item, a level of activity within the merchant location, and the like. For example, the one or more models 107 may process data signals, generate updated route segments and generate output including command instructions to update the user interface of the shopper device 131. In some examples, the updated user interface 400A may display the updated aggregated shopper route 401 to include one or more updated route segments (e.g., route segments 401A,401B) that indicate a path to and from the new location of a requested grocery item based on a data signal that indicates the new location of the grocery item. An example of data signals within a merchant location is further described with reference to FIG. 7.

The route segments 401A, 401B may indicate a path to lead the shopper 135 to a specific location of a grocery item within the merchant location. For example, the route segments 401A, 401B may indicate a path to lead the shopper 135 to a specific aisle, shelf, position on a shelf, item display, or any other location identifier within the merchant location. In some examples, the route segments 401A, 401B may indicate a path to grocery items located in a common section or region of the merchant location. The destination of the route segments 401A, 401B may be determined based on merchant data 110. For example, merchant data 110 may include the location of grocery items within the merchant location.

By way of example, route segment 401A and route segment 401B may be consecutive based on route segment 401A and route segment 401B indicating a path to produce grocery items which are both located in the produce section of the merchant location. For instance, user interface 400B indicates a produce section element 405 of the merchant location where similar (e.g., produce) grocery items are located. The produce section element 405 may indicate that raspberries and strawberries are both produce items and are located in the produce section of the merchant location. In some examples, route segment 401B may indicate a path to lead the shopper 135 from the location of the raspberries (e.g., the destination of route segment 401A) to the location of strawberries (e.g., the destination of route segment 401B). In some examples, the route segments 401A, 401B may indicate the most efficient path from a first requested grocery item within the merchant location to a second requested grocery item within the merchant location. In other examples, route segments 401A, 401B may indicate a path of travel to accommodate contextual information associated with the merchant location.

In some examples, the route segments 401A, 401B may be prioritized to indicate a path to priority items prior to indicating a path to non-priority items. For example, in FIG. 4B, the user interface 400B includes an priority items element 403. In some examples, the essential items element 403 may indicate user preference selections 246 of the user 125. For example, a user 125 may indicate a user preference selection 246 that indicates that the grocery item is priority (e.g., required to complete the order request). The user preference selections 246 may be included in user data 106 and transmitted to the shopper device 131 to ensure the shopper 135 selects the priority items included in the order request. By way of example, the user 125 may include apples and oranges in the order request and indicate that apples are priority as a user preference selection 246. In some examples, the route segments 401A, 401B may be prioritized so that the route segment 401A leads the shopper 135 to the priority apples, prior to route segment 401B that leads the shopper 135 to the non-priority oranges.

In some examples, the priority items element 403 may include grocery item elements 404 that identifies the priority items by an image and the name of the grocery items. In some examples, the grocery item elements 404 may be grouped based on whether the items are priority. In other examples, the grocery item elements 404 may be grouped based on whether the items are non-priority. In other examples, the grocery item elements 404 may be grouped based on the location or section (e.g., produce section 405) of the merchant location where the grocery items are located. The grocery item element may be used to identify and/or group requested grocery items requested by the user 125.

The aggregated shopper route 401 may include route segments 401A, 401B that may be prioritized based on the items that include a priority items element 403. By way of example, in FIG. 4C, the user interface 400C may include an priority requested grocery item 407 that includes an essential item element 403 indicating the priority requested grocery item 407 is priority and required to complete the order request. The shopper route 401 may include route segments 401A, 401B that may be prioritized to lead the shopper 135 to the priority requested grocery item 407 before non-priority grocery items 408. For instance, the shopper 135 may determine the priority requested grocery item 407 is unavailable at the merchant location and may not need to select the non-priority grocery items 408 or the remaining requested grocery items. In some examples, the essential requested grocery item 407 may include a user preference selection 246 that indicates a replacement grocery item. In some examples, the route segment that indicates a path to the priority requested grocery item 407 may be updated to indicate a path to the replacement grocery item. In some examples, the aggregated shopper route 401 may be updated to indicate updated route segments that indicate an updated path from the replacement grocery it to the closest requested grocery item included in the order request. In other examples, the updated route segments may be updated to indicate a path to the next priority requested grocery item 407.

The user interface 400B may indicate a shopper summary 402 that indicates an estimated time (e.g., estimated time to pack 250) to complete the aggregated shopper route 401, the total number of requested grocery items included in the order request, and the total number of essential grocery items. In some examples, the shopper summary 402 may be indicative of an estimated time for the shopper 135 to execute each route segment (e.g., 401A, 401B, etc.). In some examples, the shopper summary may be updated based on locational characteristics of the requested item. For example, data signals may indicate an updated location of a requested item, the availability (e.g., in stock, out of stock, etc.,) of a requested item, a level of activity within the merchant location, and the like. For example, the one or more models 107 may process data signals and output command instructions to update the user interface of the shopper device to display the updated aggregated shopper route 401 to include a route segment that indicate a path to the new location of a requested grocery item based on a data signal that indicates the new location of the grocery item. In some examples, the shopper summary 402 may be updated based on the updated route segments. For example, an updated route segment that indicates a path to an opposite region of the merchant location may increase the estimated time to complete the aggregated shopper route 401.

In some examples, the user interface 400C may include an interactive "Start Shopping" element 406 that allows the shopper 135 to provide user input indicating that the shopper 135 will begin shopping (e.g., begin executing the aggregated shopper route 401, route segments 401A, 401B, etc.). For example, the shopper 135 may arrive at the merchant location and review the order request including the aggregated shopper route 401, the shopper summary 402, priority items 403, and each grocery item element 404. In some examples, the shopper 135 may interact (e.g., click) the interactive "Start Shopping" element 406 to provide user input that the shopper 135 intends to being shopping (e.g., begin executing the aggregated shopper route 401, route segments 401A,401B). In some examples, the "Start Shopping" element 406 may be a trigger to display a first route segment that leads the shoppers to a first grocery item requested by the user 125. For instance, the user interface of the shopper device 131 may iteratively update to display each route segment based on the shopper 135 indicating that an item has been selected or disregarded (e.g., indicating unavailability). In some examples, subsequent route segments may be iteratively updated and displayed based on whether the shopper 135 indicates an item has been selected or disregarded. For example, the shopper 135 may indicate that an item is unavailable, and the user interface of the shopper device 131 may be updated to display a route segment that indicates a path to a replacement item. An example, user interface of a shopper device 131 iteratively displaying route segments is further described with reference to FIGS. 8A-C.

Figure 5:
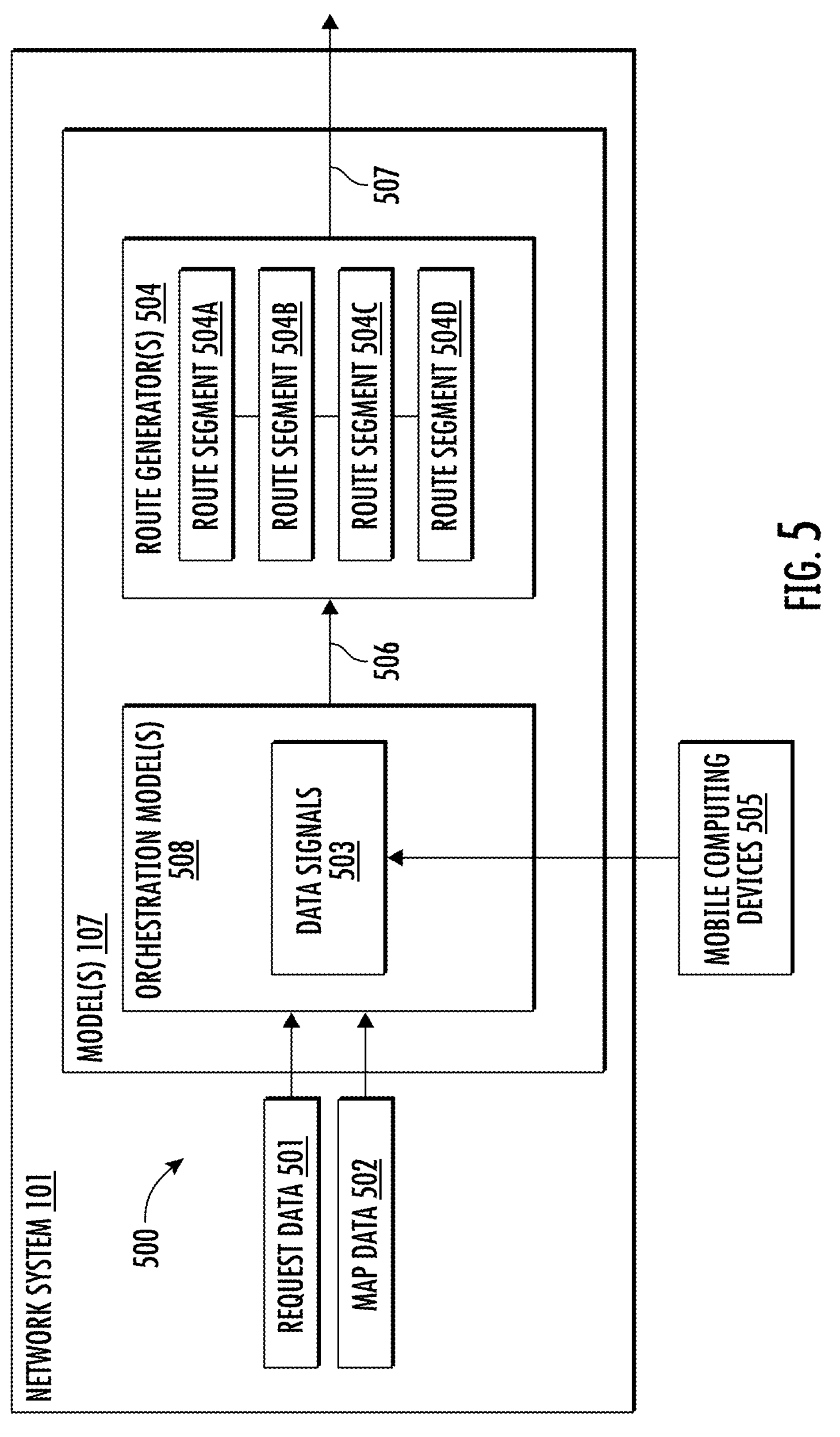
FIG. 5 depicts a block diagram of an example data processing pipeline according to example aspects of the present disclosure.

FIG. 5 depicts a block diagram of an example data processing pipeline according to example aspects of the present disclosure. The following description of data flow pipeline 500 is described with an example implementation in which the network system 101 utilizes request data 501, map data 502, data signals 503 from one or more mobile computing devices 505 within the merchant location, and one or more models 107 to generate output data 507 indicative of one or more route segments (e.g., route segments 504A-504D) that indicate a path to respective items included in the order request. The output 507 may include command instructions to generate a user interface on the shopper device 131 that iteratively displays each route segment (e.g., route segments 504A-504D) of the one or more route segments based on the shopper 135 selecting or disregarding the respective items. In some examples, the output data 507 may include command instructions to generate a user interface on the shopper device 131 that displays the aggregated shopper route 401. Additionally, or alternatively, one or more portions of the dataflow pipeline 500 may be implemented by the shopper device 131.

The network system 101 may access request data 501 indicative of the order request submitted by the user 125. For instance, request data 501 may include the requested items (e.g., item ids 241) and user preference selections 246 selected by the user 125. In some examples, request data 501 may include merchant data 225 (e.g., location 235, inventory 240, etc.). Request data 501 may be generated by querying data stored in the data repository 105 to obtain the data needed to generate route segments 504A-D.

By way of example, a user 125 may submit, via the user device 121, a grocery delivery service order request including four grocery items from a merchant location and indicate that one of the grocery items is a priority grocery item. The order request system 104 may receive the order request, process the request by assigning a shopper 135, and provide data indicative of the order request to the data repository 105. For instance, the requested grocery items and user preference selections 246 may be stored as user data 106 indicating a pending (e.g., active) order request associated with the user profile of the user 125 including one or more user preference selections 246. In some examples, the merchant location and location of the requested grocery items within the merchant location may be stored as merchant data 110. For instance, merchant data 110 may be updated to reflect a decrease in inventory levels for the requested grocery items to compensate for the likely decrease of inventory at the merchant location due to the order request. The network system 101 may query the data repository 105 to obtain user data 106, merchant data 110 or any other data needed to generate request data 501.

In some examples, request data 501 may be a subset of the data stored in the data repository 105. For example, request data 501 may include select relevant data needed to generate route segments 504A-D from the data repository 105. For instance, the data repository 105 may include historical data 108 indicating a user's order history from a different merchant location. Historical information from a different merchant location would not likely be relevant for generating route segments 504A-D at the requested merchant location and would not be included in request data 501.

In some examples, request data 501 may be a superset of the data stored in the data repository 105. For example, request data 501 may include all data stored in the data repository and additional data needed to generate route segments 504A-D. For instance, the data repository 105 may include user data 106, indicating the user profile and active orders, merchant data 110 indicating the merchant location and inventory, and historical data 108 indicating that the user 125 included a replacement item user preference selection 246 for specific grocery items included in all previous order requests but did not include a replacement item user preference selection 246 for the same grocery items in the current order request. In some examples, the one or more models 107 of the network system 101 may include a user preference model trained to determine replacement items. In some examples, the network system 101 may determine that the user 125 likely intended to indicate a replacement item user preference selections 246 based on the user's order history and utilize the user preference model to generate output indicative of replacement items. In some examples, the output of the user preference model may be included in the request data 501. In some examples, request data 501 that includes output from the user preference model may be used to prioritize the route segments 504A-D. For instance, priority items will indicate prioritized route segments to select the priority items prior to non-priority items.

The network system 101 may generate request data 501 by querying the data repository 105 or receiving data from alternative sources (e.g., one or more models 107). In some examples, the network system 101 may generate request data 501 instantaneously upon receiving the order request from the user 125. In some examples, the network system 101 may generate request data 501 when the shopper 135 reaches the merchant location. In other examples, the network system 101 may generate request data 501 prior to receiving an order request. For example, a user 125 may routinely create the same order request including the same items from the same merchant location. The network system 101 may generate a request data 501 template that includes the routine order request. In some examples, the request data 501 template may be updated to reflect any changes (e.g., inventory levels indicating a replacement item is needed) in the order request.

Figure 6A:
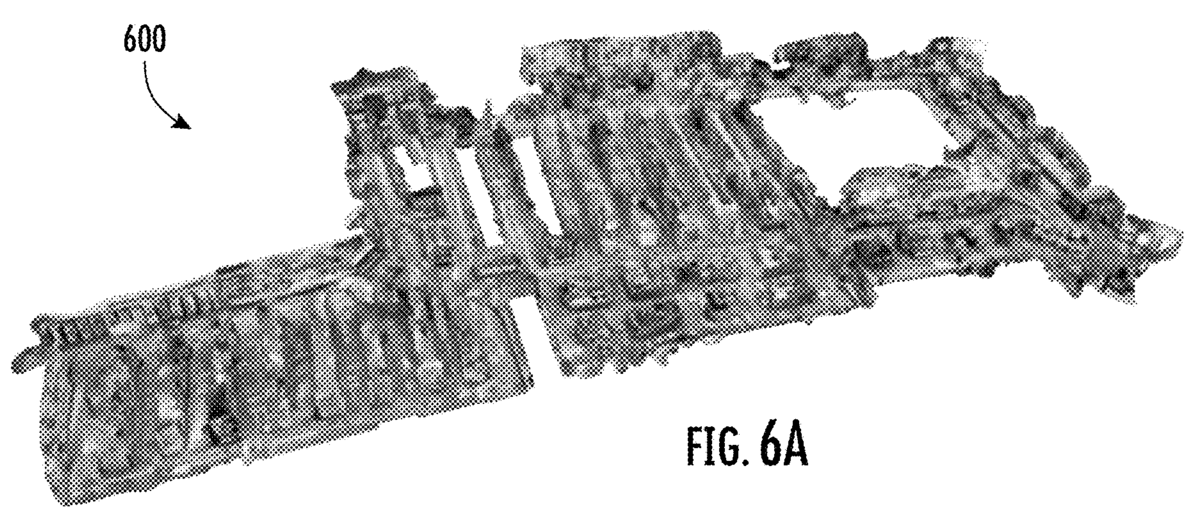
FIG. 6A-B depicts example map data according to example aspects of the present disclosure.
Figure 6B:
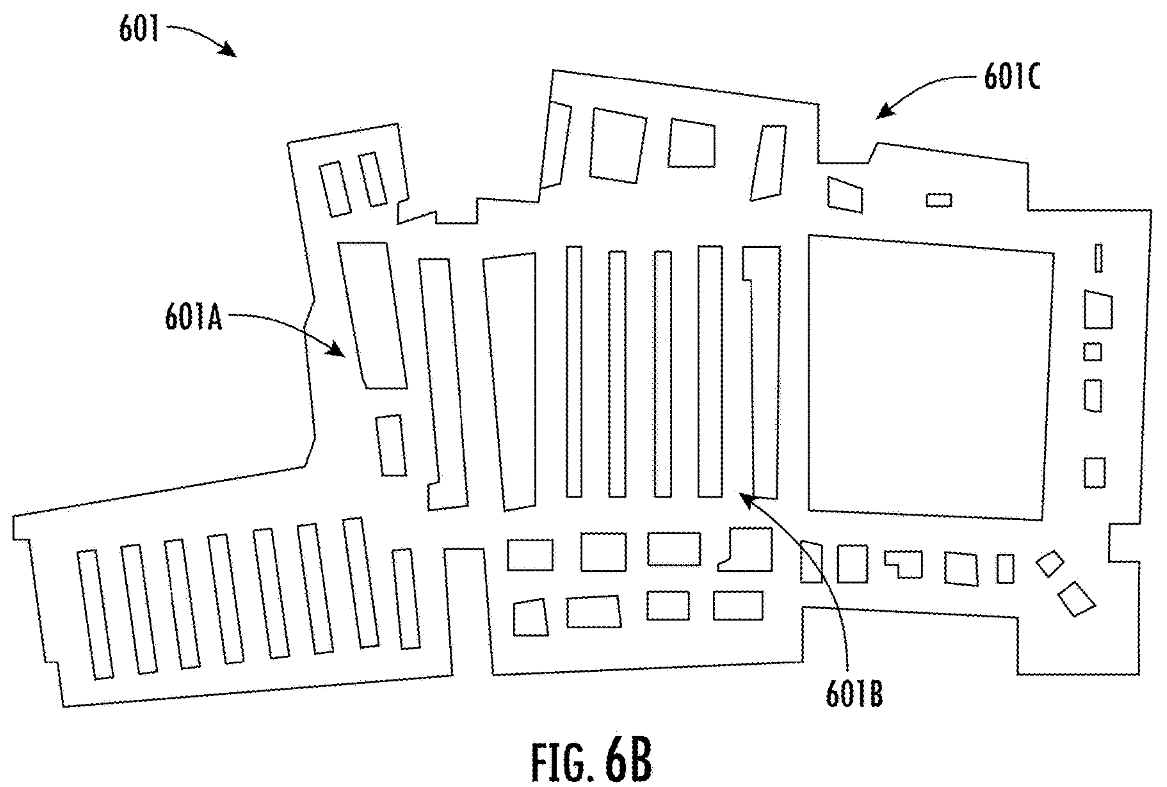

The network system 101 may access map data 502 indicative of a layout of the merchant location. Map data 502 may include any dimensional representation of the merchant location. For instance, map data 502 may include a 2D representation of the merchant location that includes the entrance, exit, aisles, shelves, item displays, and checkout locations within the merchant location. For instance, as shown in FIG. 6B, map data 502 may include a 2D layout 601 of the merchant location. The example 2D layout 601, may indicate where respective shelves 601A are located within the merchant location. In some examples, the shelves 601A may be identifiable by a shelf number, letter, or alphanumerical identifier determined by the merchant 145. In some examples, shelves 601A may align to a store topology. For instance, shelves 601A may store similar items, and be organized by sections (e.g., section 242). In some examples, shelves 601A may include item displays (e.g., end caps, standalone display, etc.) where items are located within the merchant location. In some examples, shelves 601A, may indicate any stationary or moveable location where respective grocery items are located.

The example, 2D layout 601 may include aisles 601B that indicate one or more adjacent shelves 601A. For instance, aisles 601B may be identifiable by an aisle number, letter, or alphanumerical identifier determined by the merchant 145. In some examples, aisles 601B may align to a store topology. For instance, aisles 601B may indicate a region (e.g., section) of the merchant location where similar items are located. In some examples, aisles 601 may indicate one or more shelves 601A where items may be located. In other examples, aisles 601B may indicate a section (e.g., grouping of shelves 601A) where items are located within the merchant location.

The example, 2D layout 601 may indicate the entrance and exit 601C of the merchant location. For instance, the entrance and exit 601C may indicate the primary location of the merchant location where customers ingress and egress from the merchant location. In some examples, the entrance and exit 601 may be indicative of the checkout location (e.g., location within the merchant location where items are purchased). For example, cash registers and self-checkout stations may be located near the exit of the merchant location to reduce traffic for customers who have recently purchased items. In some examples, the entrance, and exit 601C may indicate the starting point by which the route segments (e.g., route segments 604A-D) begin and end. For example, when a shopper 135 enters the merchant location, the one or more models 107 may generate route segments 504A-D with a starting point from the entrance of the merchant location. In some examples, the one or more models 107 may generate an exit route segment that indicates a path to lead the shopper 135 to exit the merchant location after purchasing the requested items.

The 2D layout 601 may be generated by merchants 145. For example, the merchants 145 may include the 2D layout 601 of the merchant location within merchant data 110 and transmit the 2D layout 601 to the network system 101. For instance, merchants 145 may be required to maintain merchant map data that includes floorplans, facility layouts, and other data that provides a dimensional layout of the merchant locations for security or regulatory reasons. The merchants 145 may store the merchant map data (e.g., floorplans, facility layouts, dimensional layouts, etc.) in the merchant systems 146 as merchant data 110. In some examples, the merchant data 110 including the 2D layout 601 of the merchant location may be transmitted to the network system 101 and stored in the data repository 105.

In some examples, the 2D layout 601 may be generated by indoor mapping software. For example, merchant locations in a geographic region may opt to provide floorplans or store layouts to general indoor mapping software companies. In some examples, indoor mapping software applications may ingest the floorplans and store layouts for merchants that opted into the indoor mapping software and generate public map data of the geographic region that includes the floorplans and store layouts of the merchants that opted into the indoor mapping software. In some examples, the indoor mapping software companies may publish the public map data. For instance, the public map data may be accessible by software code. For instance, the public map data may be accessible by an API (application programming interface) or SDK (software development kits). Public map data may be accessible by any programmatic means. In some examples, the network system 101 may obtain map data 502 by programmatically retrieving the public map data and storing the public map data as merchant data 110 in the data repository using an API or other computer code. By way of example, the network system 101 may associate the public map data including floorplans and store layout with merchants 145 and merchant locations. For instance, the public map data may include the address, name, or other identifier of the merchant location and the network system 101 may determine the address, name, or other identifier of the merchant location included in the public map data matches the name, address, or identifier of the merchant 145 and associate the public map data (e.g., floorplans, store layout, etc.) with the merchant 145.

In some examples, map data 502 may include map data of multi-level merchant locations. For instance, map data 502 may include the multiple levels of a shopping mall or grocery store. As such the map data 502 may enable routing across the multiple levels of a merchant location.

In some examples, map data 502 may include end to end map data. End to end map data may include a holistic map data set including a map of the geographic region where the shopper 135 is operating. For instance, end to end map data may include map data associated with the location of the shopper 135 at the time when the shopper 135 accepted the delivery request, map data associated with the merchant location, and map data associated with the delivery location of the user 125. As such, map data 502 may enable routing from the location of the shopper 135 at the time of acceptance through the delivery of the requested items.

In some examples, map data 502 may include a lidar generated representation of the merchant location that includes the entrance, exit, aisles, item displays, and checkout locations within the merchant location. For instance, as shown in FIG. 6A, map data 502 may include lidar generated map data 600. In some examples, lidar generated map data 600 may be 2D, 3D, or 4D lidar data. The example lidar generated map data 600, may indicate where respective shelves are located within the merchant location. In some examples, the shelves may be identifiable by a shelf number, letter, or alphanumerical identifier determined by the merchant 145. In some examples, the shelves may align to a store topology. For instance, shelves may store similar items, and be organized by sections (e.g., section 242). In some examples, shelves may include item displays (e.g., end caps, standalone display, etc.) where items are located within the merchant location. In some examples, shelves, may indicate any stationary or moveable location where respective grocery items are located.

The lidar generated map data 600 may include aisles that indicate one or more adjacent shelves. For instance, aisles may be identifiable by an aisle number, letter, or alphanumerical identifier determined by the merchant 145. In some examples, aisles may align to a store topology. For instance, aisles may indicate a region (e.g., section) of the merchant location where similar items are located. In some examples, aisles may indicate one or more shelves where items may be located. In other examples, aisles may indicate a section (e.g., grouping of shelves) where items are located within the merchant location.

The lidar generated map data 600 may indicate the entrance and exit of the merchant location. For instance, the entrance and exit may indicate the primary location of the merchant location where customers ingress and egress from the merchant location. In some examples, the entrance and exit may be indicative of the checkout location (e.g., location within the merchant location where items are purchased). For example, cash registers and self-checkout stations may be located near the exit of the merchant location to reduce traffic for customers who have recently purchased items. In some examples, the entrance, and exit may indicate the starting point by which the route segments (e.g., route segments 504A-D) begin and end. For example, the when a shopper 135 enters the merchant location, the one or more models 107 may generate route segments with a starting point from the entrance of the merchant location. In some examples, the one or more models 107 may generate an exit route segment that indicates a path to lead the shopper 135 to exit the merchant location after purchasing the requested items.

The lidar generated map data 600 may be generated by manually mapping the merchant location with one or more lidar sensors. For examples, the grocery delivery service entity may employ surveyors to manually map the merchant location by navigating the merchant location and scanning the environment with a lidar sensor. The lidar sensor data may be processed to generate the lidar generated map data 600.

In some examples, lidar generated map data 600 may be generated automatically. For example, lidar generated map data 600 may be generated by obtaining publicly available lidar data indicative of the merchant location and processing the publicly available lidar data to generate lidar generated map data 600. For instance, the lidar generated map data 600 may be generated by indoor mapping software. For example, merchant locations in a geographic region may opt to provide lidar data indicative of their respective floorplans or store layouts to general indoor mapping software applications.

As described herein, the general indoor mapping software application may ingest lidar data collected from merchants within a geographic region, generate public lidar map data including the lidar data indicative of their respective floorplans or store layouts, and publish the public lidar map data. The network system 101 may obtain map data 502 by accessing the public lidar map data and storing the public lidar map data as merchant data 110 in the data repository 105.

Returning to FIG. 5, the map data 502 may include any data indicative of the size, dimensions, and proximate location of infrastructure (e.g., sections, aisles, checkout stations, entry/exit ways), or floorplan within the merchant location. Map data 502 may be stored in the data repository 105 as accessible merchant data 110. In some, map data 502 may be pre-determined. For instance, when a first user requested grocery items from merchant location A, the network system 101 may generate map data 502 for merchant location A. When a second user requests grocery items from merchant location A, the network system 101 may not need to regenerate map data 502 and may utilize the predetermined map data 502. In other examples, the network system 101 may determine a change in the merchant data 110 (e.g., new item locations, store layout change, etc.) indicative of a change in predetermined map data. In some examples, the network system 101 may determine updated map data 502 to reflect the change in merchant data 110. In other examples, map data 502 may be generated in real-time by retrieving public map data or public lidar map data. For instance, the network system 101 may determine request data 501 includes a request for grocery items from merchant location A and generate map data 502 real-time by requesting public map data or public lidar map data programmatically from an indoor mapping software service.

The one or more models 107 of the network system 101 may include one or more orchestration models 508 trained to process request data 501, map data 502, and data signals 503 from one or more mobile computing devices 505 located proximate to the merchant location and output data 506 indicative of an initial location of each requested item, new locations of requested items, or the availability of the requested items. In some examples, the orchestration models 508 may iteratively process request data 501, map data 502, and data signals 503 from one or more mobile computing devices 505 and output data 506 based on recently transmitted data signals 505. In some examples, the orchestration models 508 may output data 506 based on receiving data signals 503 from mobile computing devices 505 currently in the merchant location. In some examples, the orchestration models 508 may output data 506 based on receiving data signals 505 from mobile computing devices 505 in the merchant location within a threshold time. In other examples, the orchestration model 508 may not receive data signals 503 from mobile computing devices 505 within a threshold time and output data 506 based on previous output data 506 from the orchestration models 508.

The orchestration models 508 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The orchestration models 508 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using labeled training data. As further described herein, the training data may include labelled data signals that have labels indicating a locational characteristics (e.g., confirming location, new item location, etc.). In some examples, the training data may include simulated training data (e.g., training data obtained from simulated scenarios, inputs, configurations, grocery store environments, etc.).

Additionally, or alternatively, the model trainer(s) may perform unsupervised training techniques using unlabeled training data. By way of example, the model trainer(s) may train one or more components of a machine-learned model to perform data signal processing through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

The orchestration models 508 may receive request data 501 indicative of the order request and map data 502 indicative of the store layout of the merchant location. In some examples, the request data 501 may include inventory data 240 indicative of the item ids 241, section 242, aisle 243, and user preference selections 246 for the requested grocery items included in the order request. In some examples, the map data 502 may include data indicative of the size, dimensions, and proximate location of infrastructure (e.g., sections, aisles, checkout stations, entry/exit ways) of the merchant location. By way of example, the orchestration models 508 may associate the item ids 241 for the requested grocery items with a corresponding section included in the map data 502 by determining the section 242 matches a section identifier on the store layout in the map data 502. In some examples, the orchestration models 508 may associate the item ids 241, with a corresponding section 242 and aisle 243 by determining the section 242 and aisle 243 match a section identifier and an aisle identifier on the store layout included in the map data 502. In other examples, the orchestration models 502 may not determine a corresponding section 242 or aisle 243 on the store layout and may output data 506 indicating the requested grocery items (e.g., item ids 241) are no longer available at the merchant location.

Figures 8A, 8B, 8C:
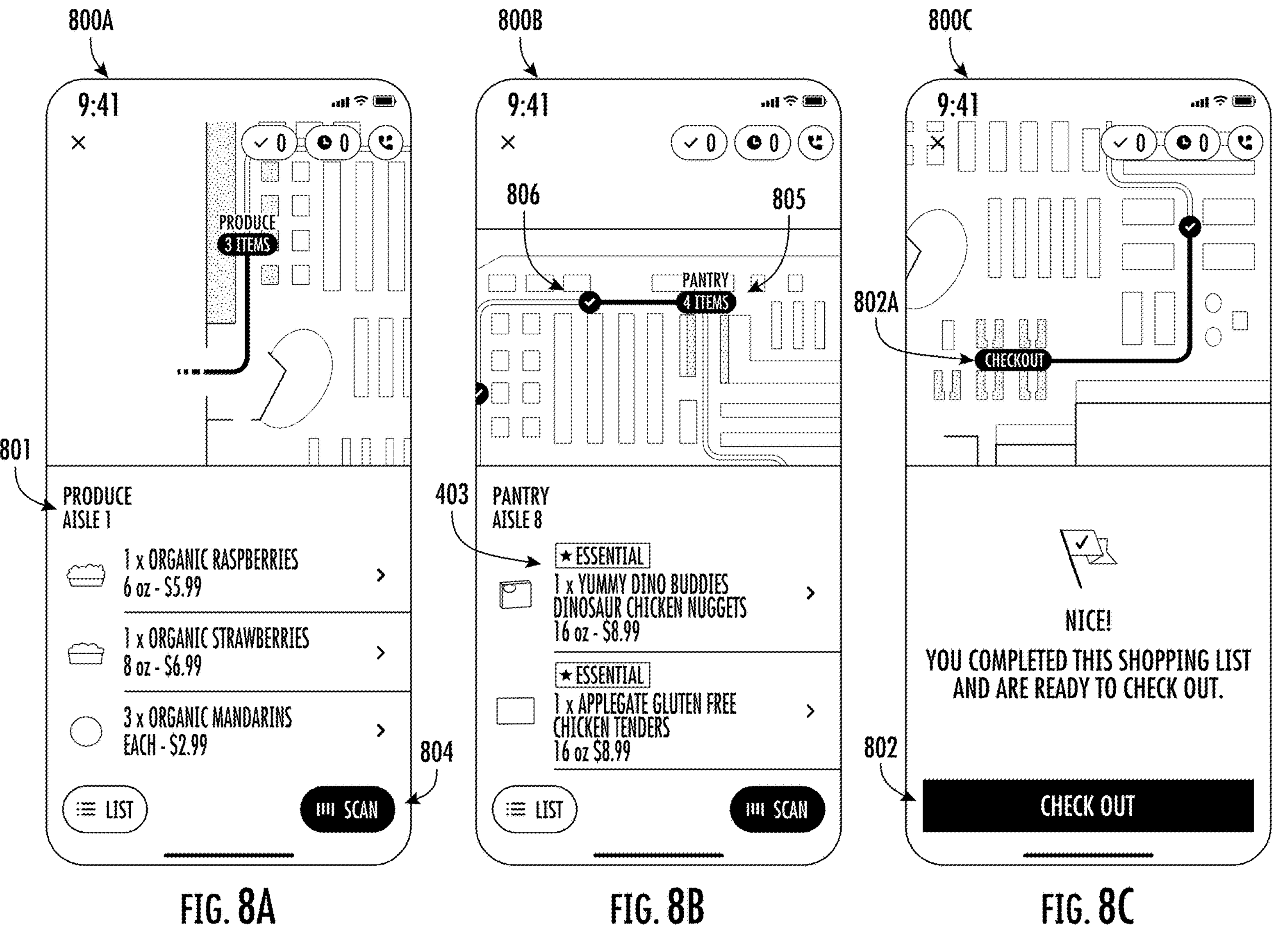
FIGS. 8A-C depicts example user interfaces according to example aspects of the present disclosure.

The orchestration models 508 may fuse request data 501 and map data 502 to generate an indoor map of the merchant location embedded with the respective locations of the requested items and replacement items. For instance, as depicted in FIG. 8A, the user interface 800A may include an indoor map 800 of the merchant location embedded with the respective locations of the requested items and replacement items. For example, user interface 800A may be the user interface of the shopper device 131. In some examples, the orchestration models may fuse request data 501 and map data 502 to generate an indoor map 800 of the merchant location embedded with the respective locations of the requested items and replacement items and include the indoor map of the merchant location in the output data 506. The output data 506 may be received by the route generators 504 and utilized to generate one or more route segments 504A-D that indicate a path for the shopper 135 to follow to select each requested item. In some examples, output data 507 may include the generated indoor map and include command instructions to update a user interface of the shopper device 131 to display the generated indoor map. For instance, as depicted in the user interface 800A, the indoor map 800 may include a map of the merchant location with location 800B of requested items.

The indoor map 800 may embed the location of requested items into the indoor map 800 by associating the locations (e.g., position, coordinates, etc.) included in the request data 501 of the requested items with a position on the map included in the map data 502. The orchestration models 508 may generate the indoor map 800 upon receiving request data 501 and map data 502 that indicate the location or position of requested items within the merchant location. In some examples, the indoor map 800 may be pre-determined. For instance, an indoor map 800 may be determined based on a first order request. In some examples, the orchestration models 508 may utilize the generated indoor map 800 for a second order request that include the same items. In other examples, the orchestration model may utilize the predetermined indoor map 800 irrespective of the similarity of items included in the order request, by updating the embedded locations of the requested items for the order request. In some examples, the orchestration models 504 may generate an updated indoor map 800 based on receiving updated map data 502 indicating a change in the floor plan or layout of the merchant location.

The orchestration models 508 may receive data signals 503 from one or more mobile computing devices 505 proximate to the merchant location. Data signals 503 may include any pulse, frequency, electromagnetic, or electrical current that carries data from one system or network to another. In some examples, data signals 503 may include digital signals such as Wi-Fi signals, Bluetooth signals, cellular network signals, NFC (near field communication), etc. Data signals 503 may include any wireless signal capable of transmitting data from one system to another.

Data signals 503 may be generated by mobile computing devices 505. In some examples, the mobile computing devices 505 may include shopper devices 135 or mobile devices associated with the merchant 145. For instance, the mobile computing devices 505 may include one or more communication interfaces that may be used to communicate with one or more other systems. The communication interfaces may include any circuits, components, software, etc. for communicating via one or more networks. In some implementations, the communication interfaces may include for example, one or more of a communications controller, receiver, transceiver, transmitter, port, conductors, software and/or hardware for communicating data/information.

In some examples, data signals 503 may be generated by the mobile computing devices 505 based on user input. By way of example, the mobile computing devices 505 may be a shopper device 131 associated with a shopper 135. The shopper 135 may traverse the merchant location and provide user input via the user interface of the shopper device 131 indicating that a requested item has been located and selected. For instance, as depicted in FIG. 8A, the example user interface 800A of the shopper device 131 depicts a "scan" user interface element 804 that allows the shopper to indicate that they have located (e.g., arrived at the location) the requested items and are now prepared to select the item by scanning a barcode or identifier to confirm the item has been selected. In some examples, the "scan" user interface element 804 may enable one or more sensors (e.g., cameras) on the shopper device 131 to obtain image data indicative of the requested grocery item. This may include capturing image data of a barcode, QR code, or another time of identifier or encoded pattern.

In some implementations, the "scan" user interface element 804 may allow the one or more sensors to obtain image data indicative of the location of the requested grocery item. In some examples, the image data may be a data signal 503. For instance, the user interface 800A may include a section and aisle user interface element 801 indicating the initial location of the requested items included in the order request.

In some examples, the shopper 135 may navigate to the section and aisle indicated by the section and aisle user interface element 801 and interact (e.g., click, touch input) the "scan" user interface element 804 to obtain sensor data. In some examples, the sensor data obtained by the shopper device 131 may generate a data signal 503 indicating locational characteristics of the requested item. For instance, sensor data may generate a data signal 503 indicating that the requested item has been located in the initial location indicated by the section and aisle user interface element 801. In some examples, sensor data may generate a data signal 503 indicating that the requested item is located in a new or different location than the location indicated by the section and aisle user interface element 801. In other examples, the sensor data may generate data signals 503 indicating that the requested items are unavailable (e.g., out of stock) at the initial location or a new location. For instance, a data signal 503 may include an image of an empty shelf, or the a different item in the initial position of the requested item.

Retuning to FIG. 5, data signals 503 may be generated by the mobile computing devices 505 based on the movement of the mobile computing device 505. For example, the mobile computing device 505 may include sensors or instruments that measure the movement of the mobile computing device 505. For instance, the mobile computing device 505 may include sensors such as an accelerometer or a gyroscope. By way of example, the mobile computing devices 505 may include shopper devices 131 associated with shoppers 135. The shoppers 135 may traverse the merchant location selecting requested grocery items included in the order request and one or more movement sensors may obtain movement data indicative of the movement of the shopper device 131. In some examples, the movement data may indicate a (i) an orientation, (ii) acceleration, or (iii) an elevation of the user device. For example, sensors that measure movement may obtain sensor data indicating that the shopper device is in a stationary position (e.g., zero acceleration) near a requested item such as a deli counter. The stationary position of the shopper device may indicate that there is a long line or wait time at the deli counter. The shopper device 131 may generate a data signal 503 indicating a high level of activity at the deli counter based on sensor data indicating the stationary position of the shopper device 131.

In some examples, the sensors of the shopper device 131 may obtain sensor data indicating an elevation of the shopper device 131 and generate data signals 503. By way of example, the shopper 135 may traverse the merchant location and locate the section and aisle of the initial location of the request item. The sensors of the shopper device 131 may obtain sensor data indicating an elevation of the shopper device 131. For instance, sensor data indicating an elevation of the shopper device 131 may indicate that the shopper 135 is reaching on the top shelf to select a requested item. In some examples, where the requested item has an initial location on the bottom shelf, the shopper device 131 may generate a data signal 503 indicating a new item location based on sensor data indicating the elevation of the shopper device 131. In some examples, where the requested item has an initial location on the top shelf and the sensors of the shopper device 131 obtain sensor data indicated an elevation of the shopper device 131, the shopper device 131 may generate a data signal 503 confirming the initial location of the requested item based on the sensor data indicating the elevation of the shopper device 131.

In some examples, data signals 503 may indicate a location or movement of the shopper 135 with in the merchant location. For example, a mobile computing device 505 that emits a data signal 503 indicating that the associated user (e.g., shopper 135) has located a requested item at an initial location will also indicate that the shopper 135 is located at the initial location of the requested item. In some examples, the sensors of the mobile computing device 505 may obtain sensor data including an acceleration an orientation of the mobile computing device 505 that indicate the user (e.g., shopper 135) is walking in a direction that leads to a second requested item. The data signals 503 indicating the acceleration and orientation of the mobile computing device 505 may indicate the location of the shopper 135 along a route segment (e.g., route segments 504A-D). In other examples, data signals 503 that indicate a location of the shopper 135 may be used to generate route segments (e.g., route segments 504A-D) that leads the shopper 135 from the current location of the shopper 135 to the location of the next requested item.

Figure 7:
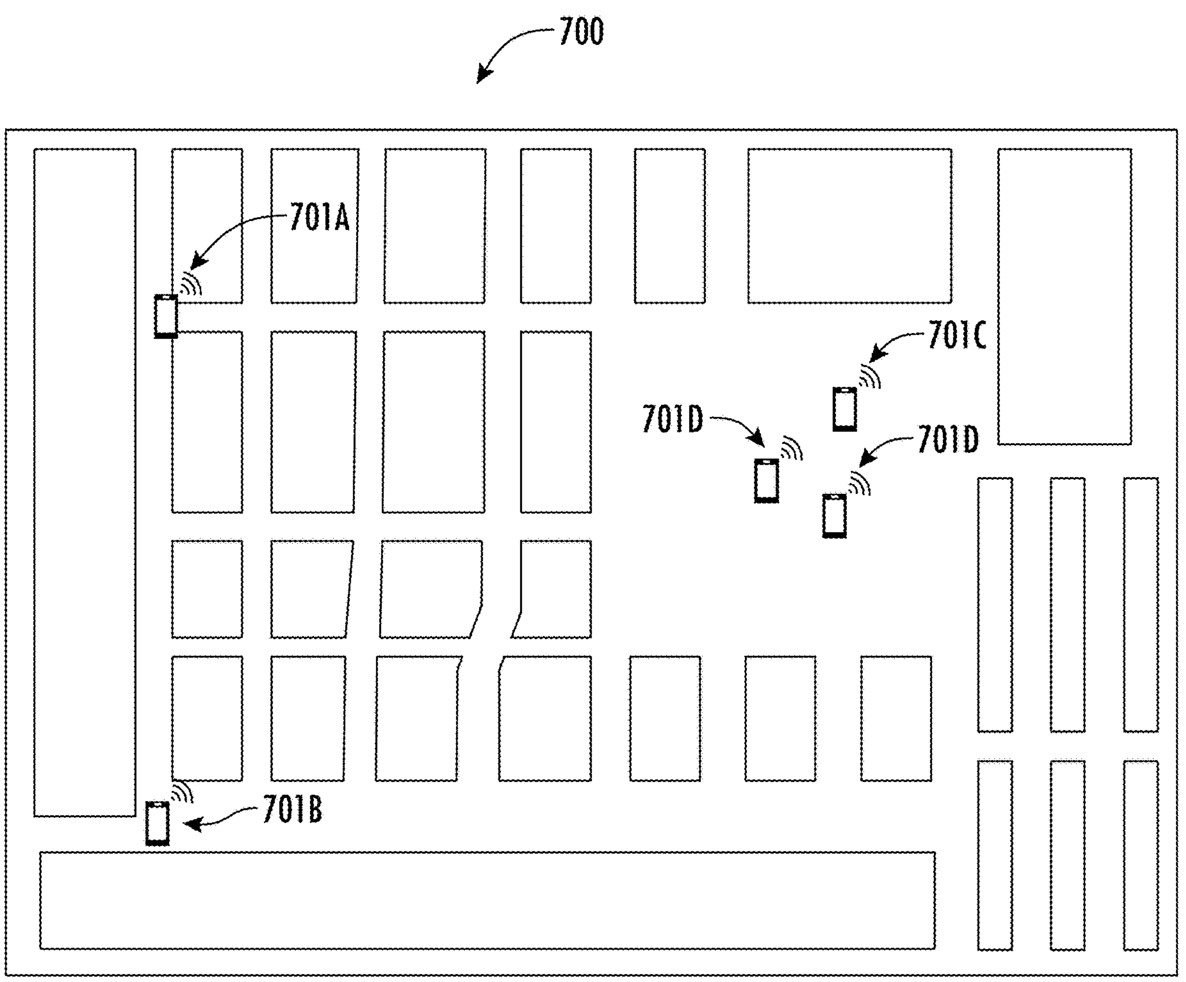
FIG. 7 depicts example data signals according to example aspects of the present disclosure.

In some examples, data signals 503 may continuously be emitted by mobile computing devices 505 as users associated with the mobile computing devices 503 traverse the merchant location. For instance, as depicted in FIG. 7, mobile computing devices 701A-E may be located in the same merchant location 700 and emit data signals 503 that may be utilized by the orchestration models 508. In some examples, the mobile computing devices 701A-E may be located in the merchant location 700 at the same time and generate data signals 503 concurrently, iteratively, or sequentially. In some examples, the mobile computing devices 701A-E may be located in the merchant location 700 at different times and may generate data signals 503 during the time when the mobile computing devices 701A-E were located in the merchant location. The orchestration models 508 may receive the data signals 503 over time from the mobile computing devices 701A-E and process the data signals 503 to generate output 506 indicative of a level of activity of the merchant location or locational characteristics of requested items.

In some examples, the orchestration models 508 may process data signals 503 and determine that the data signals 503 may be relevant to generating route segments 504A-D based on a time when the data signals 503 were generated. For example, the orchestration models 508 may determine that data signals generated within a threshold time relative to generating route segments 504A-D may be used to generate route segments 504A-D. By way of example, the orchestration models 508 may determine that data signals 503 generated in within the past hour are highly relevant and consider the data signals 503 in generating output data 506. In some examples, a moderately relevant threshold time may be 4 hours to 8 hours. For instance, the orchestration models 508 may consider data signals 503 generated 4 hours to hours prior to the generation of route segments 504A-D are moderately relevant and weigh the moderately relevant data signals 503 lower than highly relevant data signals 503. The threshold time when data signals 503 are generated by the mobile computing devices 505 proximate to the merchant location may vary. For instance, the threshold time may be a hard limit (e.g., within 1 hour exactly, 8 hours exactly, etc.). In some examples, the threshold time may be a range (e.g., 1-4 hours). The orchestration models 508 may adjust the time threshold based on more recently generated data signals, updated merchant data 110, historical trends, etc.

In some examples, the orchestration models 508 may process data signals 503 indicate a time of scan. A time of scan may indicate a time associated with a scanned item. For instance, as the shopper 135 scans items, a data signal 503 may be generated indicating a time or location where the item was scanned. By way of example, a shopper 105 may scan a first item and a second item 10 seconds apart from each other and scan a third item 20 second later. Based on data signals 503 indicating the time of scan for the first, second, and third items, the orchestration models may determine an approximate location of shopper 135 as being in aisle 4. For instance, map data 508 may indicate that the first item, second item, and third item are located within aisle 4. Based on the approximate location of the shopper 135 (e.g., via the data signals 503), the orchestration models 508 may generating route segments 504A-D.

In some examples, the orchestration models 508 may process data signals 503 and determine that they are irrelevant to generating route segments 504A-D based on the time threshold when the data signals 503 were generated. For instance, data signals 503 may be generated 24 hours or more prior to the generation of route segments 504A-D. In some examples, data signals 503 generated 24 hours or more prior to generating route segments 504A-D may allow for contextual information associated with the merchant location or locational information associated with the requested items to change. For instance, unavailable items may be restocked within the irrelevant time threshold and a data signal 503 indicating the item is unavailable may be irrelevant. The irrelevant time threshold may be a hard limit (e.g., exactly 24 hours, 48 hours, etc.) In some examples, the irrelevant time threshold may be a range (e.g., 24-48 hours). The orchestration models 508 may adjust the irrelevant time threshold based on more recently generated data signals 503, updated merchant data 110, historical trends, etc.

For example, in the merchant location 700, mobile computing device 701A may generate data signals 503 confirming an initial location of a requested item. In some examples, the data signal 503 confirming the initial location of a requested item may be processed by the orchestration models 508 and utilized to confirm the location of the requested item for subsequent request data 501 that includes an order request for the same item. By way of example, the orchestration models 508 may receive data signals 503 from mobile computing device 701A confirming the initial location of a requested item for a first order request. The orchestration models 508 may process the data signals 503 and confirm the associated initial location of the requested item indicated on the indoor map 800 of the merchant location embedded with the respective locations of the requested items is correct. The orchestration models 508 may receive request data 501 indicative of a second order request including the same item and the orchestration models 508 may utilize the processed data signals 503 confirming the location of the requested item and output data 506 indicating the confirmed location.

In some examples, the mobile computing device 701B may generate data signals 503 indicating that a requested item is unavailable. For instance, the user (e.g., shopper 135) associated with mobile computing device 701B may provide user input via a user interface of the mobile computing device 701B indicating that the requested item is unavailable. In some examples, the data signal 503 indicating the requested item is unavailable may be processed by the orchestration models 508 and utilized to indicate that the requested item is unavailable for subsequent request data 501 that includes an order request for the same item. The orchestration models 508 may receive request data 501 indicative of a second order request including the same item and the orchestration models 508 may utilize the processed data signals indicating the unavailable item and output data 506 indicating the item is unavailable. For instance, output data 506 indicating that the item is unavailable may include data indicative of a replacement item or a cancellation for the order request. A replacement item may indicate a substitute item and the location of the item in the merchant location. A cancellation may indicate that the unavailable item is a priority item required to complete the order request. In some examples, the output data indicating a cancellation of the order request may be indicative of a route segment that leads the shopper 135 to exit the merchant location.

In some examples, the mobile computing device 701B may generate data signals 503 indicating a new location of the requested item. In some examples, the data signal 503 indicating a new location of the requested item may be processed by the orchestration models 508 and utilized to update the initial location of the requested item for subsequent request data 501 that includes an order request for the same item. By way of example, the orchestration models 508 may receive data signals from mobile computing device 701A indicating the new location of a requested item for a first order request. The orchestration models 508 may process the data signals 503 and update the initial location associated the location of the requested item indicated on the indoor map of the merchant location embedded with the respective locations of the requested items is correct. The orchestration models 508 may receive request data 501 indicative of a second order request including the same item. The orchestration models 508 may utilize the processed data signals indicating the new location of the requested item and output data 506 indicating the new location.

The orchestration models 508 may output data 506 iteratively upon receiving data signals 503. By way of example, mobile computing device 701B may emit data signals indicating a new location of a requested item also needed by the user (e.g., shopper 135) associated with mobile computing device 701A. The user associated with mobile computing device 701B may be located within the merchant location at the same time as the user associated with mobile computing device 701A or within a threshold time. In some examples, the orchestration models 508 may process the data signal 503 emitted by mobile computing device 701B indicating the new location and output data 506 indicating the new location for the user associated with mobile computing device 701A.

In some examples, multiple computing devices (e.g., computing devices 701C-E) may generate data signals 503 within a close proximity. For instance, mobile computing devices 701C-E may emit data signals indicating a stationary (e.g., zero acceleration) position. In some examples, the data signals indicating a stationary position of multiple computing device (e.g., computing devices 701C-E) within a close proximity may indicate a high level of activity within the merchant location where the mobile computing devices 701C-E are located. For instance, mobile computing devices 701C-E may be located near the deli counter within the merchant location and generate data signals 503 indicating a stationary position of the mobile computing devices 701C-E. The orchestration models 508 may process the data signals 503 indicating the stationary positions of the mobile computing devices 701C-E and generate output data 506 that indicates a high level of activity at the deli counter. In some examples, where request data 501 includes requested items from the deli counter where there is a high level of activity, the orchestration models 508 may output data 506 indicating the requested items from the deli counter should be deprioritized to allow time for the activity level to decrease. For instance, the output data 506 may indicate that other requested items should be selected prior to the items located at the deli counter.

In some examples, multiple computing devices (e.g., computing devices 701C-E) may generate data signals 503 within a close proximity at varying times. For instance, the orchestration models 508 may determine that mobile computing devices 701C-E generate data signals indicating a high level of activity at a specific time each day and determine that other mobile computing devices 505 do not generate data signals 503 indicating high levels of activity at earlier or later times. In some examples, the orchestration models 508 may output data 506 indicating that requested items located in an area of high activity level should be prioritized or deprioritized based on the times where the mobile computing devices 701C-E indicate high levels of activity.

Returning to FIG. 5, the orchestration models 508 may receive as input request data 501, map data 508 and data signals 503 from mobile computing devices 505 located proximate to the merchant location. In some examples, the orchestration models 508 may fuse request data 501 and map data 502 to generate an indoor map 800 of the merchant location embedded with the respective locations of the requested items and replacement items. In some examples, the orchestration models 508 may process the data signals to generate output data 506 indicative of locational characteristics of requested items and activity levels within the merchant location.

In some examples, the output data 506 generated by the orchestration models 508 may be received as input by the route generators 504. The route generators 504 may process the output data 506 from the orchestration models 508 and generate one or more route segments 504A-D. In some examples, the route generator 504 may output data 507 indicative of the route segments 504A-D. For instance, the output data 507 may include command instructions to update a user interface of the shopper device 131 that displays the respective route segments 504A-C that leads the shopper 135 to the each respective item included in the order request. In some examples, the output data 507 may include command instructions to iteratively update the user interface of the shopper device 131 to display each route segment of the plurality of route segments 504A-D generated by the route generator 504. In some examples, the output data 507 may include command instructions to update the user interface of the shopper device 131 to display the aggregated shopper route 401. In other examples, the output data 507 may include command instructions to update the user interface of the shopper device 131 to indicate a replacement route segment that indicates a path to lead the shopper 135 to a replacement item.

The route generators 504 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The route generators 504 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using labeled training data. As further described herein, the training data may include labelled map data indicating the location of requested items (e.g., initial location, new location, replacement item locations, etc.). In some examples, the training data may include simulated training data (e.g., training data obtained from simulated scenarios, inputs, configurations, grocery store environments, etc.).

Additionally, or alternatively, the model trainer(s) may perform unsupervised training techniques using unlabeled training data. By way of example, the model trainer(s) may train one or more components of a machine-learned model to perform map data processing through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

In some examples, the route generators 504 may process the output 506 including the indoor map 800 of the merchant location embedded with the respective locations of the requested items to determine the coordinates (e.g., section, aisle, shelve, position on shelf, etc.) or locations between the requested items. In some examples, the output 506 may include the current location of the shopper 135 by receiving a data signal indicating that the shopper has arrived at the merchant location. In some examples, data signals indicating that the shopper has arrived at the merchant location will indicate that the first route segment (e.g., route segment 504A) should begin at the entrance of the merchant location.

The route generators 504 may determine all available routes that intersect with the coordinates or locations each requested grocery and score the routes to determine the route segments that account for additional factors such as data signals 503. For instance, the route generators 504 may determine a plurality of possible routes (e.g., 76 possible routes) are available that would begin at the entrance of the merchant location, intersect with the coordinates or location of each requested item including the checkout location, and end at the exit of the merchant location. In some examples, the route generators 504 may score the possible routes and determine that only a subset of the possible routes (e.g., 15 of 76 possible routes) will provide the shortest distance. In some examples, the route generators 504 may determine that data signals 503 indicating one or more requested item are located near a high level activity area and determine that only one or more of the subset of possible routes (e.g., 4 possible routes) will avoid the high level activity area. In some examples, the route generators 504 may generate route segments 504A-D based on the distance and activity level of the merchant location and generate output data 507 including command instructions to update the user interface of the shopper device 131 that indicates the route segments 504A-D that will lead the shopper 135 to each requested item.

By way of example, the route generators 504 may generate replacement item route segments that indicates a path that will lead the shopper 135 to a replacement item. For instance, the route generators 504 may receive output data 506 including data signals 503 that indicating that a requested item is unavailable. In some examples, the route generators 504 may generate a replacement route segment that indicates a path that will lead the shopper 135 from their current position (e.g., entrance, last selected item, etc.) to the replacement item based on the data signal 503 indicating the requested item is unavailable. In some examples, the route generators 504 may generate replacement route segments real-time based on receiving output data 506 that includes data signals 503 indicating that a requested item is unavailable. For instance, the route generators 504 may generate a first route segment (e.g., route segment 504A) and a second route segment (e.g., route segment 504B) that indicates a path to the first and second requested item. In some examples, the orchestration model may receive data signals 503 indicating that the second requested item is unavailable while the shopper 135 is en route to the first requested item (e.g., executing route segment 504A) and generate output data 506 indicating that the second requested item is unavailable and identifying the coordinates or location of the replacement item. In some examples, the route generators 504 may generate an updated route segment (e.g., route segment 504B) that indicates a path to the replacement item and output data 504 including command instructions that update the user interface of the shopper device 131 to indicate a path to the replacement item.

In some examples, the route generators 504 may generate route segments that include replacement item route segments. For instance, the route generators 504 may receive first output data 506 indicating the coordinates or location of replacement items to avoid reprocessing output data 506 in the event that a data signal 503 is received by the orchestration model 508 indicating that a requested item is unavailable. For instance, the route generators 504 may generate output data 507 including alternative of contingency route segments indicative of replacement item route segments. The output data 507 including alternative of contingency route segments may include command instructions that indicate boolean logic (e.g., if, then logic) or tree structures to update the user interface of the shopper device 131 to display replacement item route segments only in the event that the shopper 135 indicates that the requested item is unavailable.

In some examples, the route generators 504 may determine an estimated time that will be needed to execute the route segments 504A-D. For instance, the route generators 504 may determine that route segment 504C indicates a path from the location of a third requested item in an aisle adjacent to the location of a fourth requested item. The route generators 504 may estimate a travel time of 45 seconds to execute route segment 504C based on the distance between the third and fourth requested items. The route generators may determine an estimated time to execute all of the route segments (e.g., route segments 504A-D) based on determining the estimated time to execute each route segment. In some examples, the route generators 504 may output data 507 indicating the estimated time to complete the route segments 504A-D. For instance, the output data 507 may include command instructions to update a user interface of the shopper device 131 to display the estimated time. For example, as depicted in user interface 400B, the shopper summary 402 may include the estimated time to execute the route segments.

In some examples, the route generators 504 may determine an estimated time based on previous route segments. For example, the route generators 504 may estimate a time of 1 minute to execute route segment 504D at 1 PM. Mobile computing systems 505 may generate data signals 503 indicating a high level of activity intersecting the path of route segment 504D. In some examples, the data signal indicating a high level of activity may lead to delays in executing route segment 504D. In some examples, the route generators 504 may adjust the estimated time to complete route segment 504D at 1 PM based on the data signals 503 indicating a high level of activity at 1 PM which resulted in an increased time to execute route segment 504D. In some examples, the route generators 504 may generate output data 507 including command instructions to update the user interface of the shopper device 131 that updates the shopper summary 402 to include the updated estimated time.

In some examples, the route generators 504 may prioritize the route segments 504A-D. For instance, request data 501 may include user preference selections 246 that indicate that one or more requested items are priority and required to complete the order request. In some examples, the route generators 504 may prioritize route segments 504A-D that indicate respective route segments that indicate a path to the priority items prior to the items that have not been indicated as priority. By way of example, a user 125, may submit an order request for items A, B, C, and D and indicate that items B and C are priority items. The route generators 504 may generate prioritized route segments 504A-D that indicate a path to the priority B and C items prior to items A and D. For instance, route segment 504A may indicate a path to priority item B, route segment 504B may indicate a path to priority item C, and route segments 504C-D may indicate a path to requested items A and D respectively. For example, as depicted in FIG. 8B, user interface 800B may be the user interface of a shopper device 131 and display a priority user interface element 403 that indicates the priority items. In the example, user interface 800B the prioritized route segments may be displayed with the priority user interface element 403 to indicate that the prioritized route segments are leading the shopper 135 to the priority items prior to items that are non-priority items.

In some examples, the route generators 504 may generate prioritized route segments 504A-D and generate updated route segments based on a priority item being unavailable. By way of example, the route generators 504 may generate route segment 504A indicating a path to a priority item. The shopper 135 may execute route segment 504A and indicate that the priority item is unavailable, but providing user input via the shopper device 131, or by generating a data signal 503 indicating the priority item is unavailable. In some examples, the prioritized route segments 504A-D may be updated to indicate that route segment 504B should indicate a path to the exit of the merchant location. For instance, the priority items are required to complete the order request and based on determining one or more priority items are unavailable, the route generators 504 may generate output data 507 indicating an exit route segment. For example, the output data 507 may include command instructions to update the user interface of the shopper device 131 that displays a cancelled order user interface element and a route segment that indicates a path to the exit of the merchant location.

In some examples, the route generators 504 may generate an aggregated shopper route 401 that displays a compiled view of the route segments 504A-D. For instance, as depicted in user interface 400A, the aggregated shopper route 401 may display the complete path the shopper 135 is to travel to select each requested item. By way of example, the route generators 504 may receive output data 506 and generate route segments 504A-D. In some examples, the route generators 504 may generate output data 507 indicative of all of the route segments 504A-D. The output data 507 indicative of all of the route segments 504A-D may include command instructions to update a user interface of the shopper device 131 to display the aggregated shopper route 401 including all of the route segments 504A-D.

In some examples, the route generators 504 may iteratively generate route segments 504A-D and output data 507 indicative of the route segments 504A-D based on the shopper 135 selecting or disregarding the requested item. By way of example, the route generators 504 may receive output data 506 and generate route segment 504A that indicates a path from the current location (e.g., the entrance of the merchant location) of the shopper 135 to the location of the first requested item. In some examples, the route generators 504 may generate output 507 including command instructions that update the user interface of the shopper device 131 to display route segment 504A. In some examples, the shopper 135 may execute route segment 504A and indicate that the item has been selected by providing user input via the shopper device. For instance, as depicted in user interface 800A, the shopper 135 may interact (e.g., click) the "scan" user interface element 804 and scan the requested item. The user input may be received by the network system 101 and trigger the route generators 504 to generate route segment 504B. For instance, the route generators 504 may generate route segment 504B that indicates a path from the current location of the shopper 135 (e.g., the location of the first requested item) to the location of the second requested item and output data 507 indicative of route segment 504B. For example, the route generators 504 may generate output data 507 including command instructions to update the user interface of the shopper device 131 to display route segment 504B. The route generators 504 may iteratively generate route segments 504A-D and output data 507 indicative of respective route segments to iteratively update the display of the shopper device 131.

For example, as depicted in FIG. 8B, the user interface 800B may be the user interface of a shopper device 131 and display route segments that iteratively update. For example, the user interface 800B may iteratively update to display route segment 804. Route segment 805 may be highlighted to indicate the current route segment in progress. In some examples, route segment 805 may indicate the number of remaining items to be selected by the shopper 135. In some examples, the user interface 800B may indicate the future route segments 806. For instance, future route segments 806 may indicate unhighlighted route segments that indicate that one or more previous route segments (e.g., route segment 804) that must be completed prior to displaying the future route segment 806. In some examples, the route generators 504 may output data 507 including command instructions that updates the user interface 800B of the shopper device 131 to display the future route segments 806 based on the shopper 135 executing the previous route segment (e.g., route segment 805) and indicating the requested items that route segment 805 leads to has been selected or disregarded.

In some examples, the future route segment 806 may indicate a replacement route segment. For example, the orchestration model 508 may receive data signals 504 indicating that a second requested item is unavailable while the shopper 135 is en route to the first requested item (e.g., executing route segment 805) and generate output data 506 indicating that the second requested item is unavailable and identifying the coordinates or location of the replacement item. In some examples, the route generators 504 may generate an updated route segment (e.g., future route segment 806) that indicates a path to the replacement item and output data 504 including command instructions that update the user interface of the shopper device to indicate a path to the replacement item.

In some examples, the route generators 504 may generate a checkout route segment to indicate a path to the location within the merchant location where the shopper 135 may purchase the selected items (e.g., check out). For example, when a shopper 135 has selected all of the requested grocery items, the route generators 504 may generate a checkout route segment. As depicted in FIG. 8C, the route generators 504 may output data 507 including command instructions to generate user interface 800C. For instance, user interface 800C may be the user interface of the shopper device 131 and indicate a checkout route segment 802A to lead the shopper 135 to the checkout area of the merchant location to purchase the selected items. In some examples, the checkout route 802A may indicate a path from the current position of the shopper 135 (e.g., the location of the last requested item) to the checkout location within the merchant location. In some examples, the checkout route segment 802A may not be displayed until the shopper 135 has indicated that the last requested item has been selected or disregarded. In some examples, the user interface 800C may include an interactive "checkout" user interface element 802. By way of example the shopper 135 may interact with (e.g., click) the "checkout" user interface element 802 to provide user input that shopper 135 has purchased the requested items. In some examples, when the shopper 135 indicates that the items have been purchased, an order request updated may be transmitted to the network system 101 to indicate that the requested items are en route to the user 125. For instance, the network system 101 may transmit data indicative of the order request to the user device 121 to update a user interface of the user device 121 indicating the order request update.

FIG. 9 depicts a flowchart diagram of an example method according to example aspects of the present disclosure. One or more portion(s) of the method 900 may be implemented by one or more computing devices such as for example, the computing devices/systems described in FIGS. 1, 3, 4A-C, 5, 8A-C, 10, etc. Moreover, one or more portion(s) of the method 900 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 900. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 900 may include a step 902 accessing, by a computing system, data indicative of a plurality of items associated with a delivery request, the delivery request being indicative of a merchant that provides the plurality of items. For instance, the network system 101 may access the order request system 104 indicating an order request has been submitted by a user 125. For example, the user 125 may submit via an application 122 running on a user device 121, an order request including grocery items available at a merchant location. A network system 101 (e.g., grocery delivery service entity) may receive the order request from the user device 121 and an order request subsystem 104 may process the order request to coordinate with a shopper 135 via the shopper device 131 to select and/or delivery the requested grocery items. The network system 101 may access the order request including the one or more items associated with the order request.

The method 900 may include a step 904 accessing, by the computing system, map data indicative of a layout of a merchant location associated with the merchant and initial location data indicative of a respective initial location for each of the plurality of items within the merchant location. For instance, merchants 145 may store the merchant map data (e.g., floorplans, facility layouts, dimensional layouts, etc.) in the merchant systems 146 as merchant data 110. In some examples, the merchant data 110 including a 2D layout 601 of the merchant location may be transmitted to the network system 101 and stored in the data repository 105. In some examples, the network system 101 may obtain map data 502 by accessing the public lidar map data and storing the public lidar map data as merchant data 110 in the data repository.

In some examples, initial location data may indicate the recorded position or location within the merchant location where respective items should be located based on inventory data 240 generated by the merchant 145. As described herein, the merchant 145 may record the position or locations of respective items for sale in the merchant location and store the position or location as inventory data 240 in the merchant system 146. In some examples, the initial location data may not be the current location of the respective items. For instance, the merchant may move the location of respective items, but fail to update the inventory data 240 that indicates the changed location. In some examples, the initial location data may not be correct because the location or position was incorrectly recorded. For instance, the merchant 145 may enter the incorrect position or location of respective items as inventory data 245 and store the incorrect position or location in the merchant system 146. In other examples, the initial position data may indicate the correct position or location of respective items. In some examples, the initial location data may include a position or location identifier. For instance, the initial location data may indicate a specific shelf, aisle number, section of store, etc. In some examples, the position or location identifier may be associated with map data 502.

By way of example, the network system 101 may associate the public lidar map data including lidar data indicative of the floorplans and store layout with merchants 145 and merchant locations. For instance, the public lidar map data may include the address, name, or other identifier of the merchant location and the network system 101 may determine the address, name, or other identifier of the merchant location included in the public lidar map data matches the name, address, or identifier of the merchant 145 and associate the public lidar map data with the respective merchants 145. The network system 101 may access the map data 502 stored in the data repository 105 or access public map data/public lidar map data by accessing indoor mapping software companies via computer code to retrieve the public map data/public lidar map data on demand.

The orchestration models 508 may fuse request data 501 and map data 502 to generate an indoor map of the merchant location embedded with the respective locations of the requested items and replacement items. For instance, as depicted in FIG. 8A, the user interface 800A may include an indoor map 800 of the merchant location embedded with the respective locations of the requested items and replacement items. For example, user interface 800A may be the user interface of the shopper device 131. In some examples, the orchestration models may fuse request data 501 and map data 502 to generate an indoor map 800 of the merchant location embedded with the respective locations of the requested items and replacement items and include the indoor map of the merchant location in the output data 506. The output data 506 may be received by the route generators 504 and utilized to generate one or more route segments 504A-D that indicate a path for the shopper 135 to follow to select each requested item. In some examples, output data 507 may include the generated indoor map and include command instructions to update a user interface of the shopper device 131 to display the generated indoor map. For instance, As depicted in the user interface 800A, the indoor map 800 may include a map of the merchant location with location 800B of requested items.

The indoor map 800 may embed the location of requested items into the indoor map 800 by associating the locations (e.g., position, coordinates, etc.) included in the request data 501 of the requested items with a position on the map included in the map data 502. The orchestration models 508 may generate the indoor map 800 upon receiving request data 501 and map data 502 that indicate the location or position of requested items within the merchant location. In some examples, the indoor map 800 may be pre-determined. For instance, an indoor map 800 may be determined based on a first order request. In some examples, the orchestration models 508 may utilize the generated indoor map 800 for a second order request that include the same items. In other examples, the orchestration model may utilize the predetermined indoor map 800 irrespective of the similarity of items included in the order request, by updating the embedded locations of the requested items for the order request. In some examples, the orchestration models 504 may generate an updated indoor map 800 based on receiving updated map data 502 indicating a change in the floor plan or layout of the merchant location.

The method 900 may include a step 906 processing, by the computing system, one or more data signals from one or more mobile computing devices located within the merchant location to perform at least one of the following: (i) confirm an initial location of a respective item; (ii) determine a new location of the respective item that is different from an initial location of the respective item; or (iii) determine an availability of the respective item within the merchant location. For instance, the network system 101 may include one more models 107. The one or more models 107 may include orchestration models 508 trained to process request data 501, map data 502, and data signals 503 from one or more mobile computing devices 505 located proximate to the merchant location and output data 506 indicative of an initial location of each requested item, new locations of requested items, or the availability of the requested items. In some examples, the orchestration models 508 may iteratively process request data 501, map data 502, and data signals 503 from one or more mobile computing devices 505 and output data 506 based on recently transmitted data signals 505. In some examples, the orchestration models 508 may output data 506 based on receiving data signals 503 from mobile computing devices 505 currently in the merchant location. In some examples, the orchestration models 508 may output data 506 based on receiving data signals 505 from mobile computing devices 505 in the merchant location within a threshold time. In other examples, the orchestration model 508 may not receive data signals 503 from mobile computing devices 505 within a threshold time and output data 506 based on previous output data 506 from the orchestration models 508.

In some examples, the orchestration models 508 may process data signals 503 and determine that the data signals 503 may be relevant to generating route segments 504A-D based on a time when the data signals 503 were generated. For example, the orchestration models 508 may determine that data signals generated within a threshold time relative to generating route segments 504A-D may be used to generate route segments 504A-D. By way of example, the orchestration models 508 may determine that data signals 503 generated in within the past hour are highly relevant and consider the data signals 503 in generating output data 506. In some examples, a moderately relevant threshold time may be 4 hours-8 hours. For instance, the orchestration models 508 may consider data signals 503 generated 4-8 hours prior to the generation of route segments 504A-D are moderately relevant and weigh the moderately relevant data signals 503 lower than highly relevant data signals 503. The threshold time when data signals 503 are generated by the mobile computing devices 505 proximate to the merchant location may vary. For instance, the threshold time may be a hard limit (e.g., 1 hour exactly, 8 hours exactly, etc.) In some examples, the threshold time may be a range (e.g., 4-8 hours). The orchestration models 508 may adjust the time threshold based on more recently generated data signals, updated merchant data 110, historical trends, etc.

In some examples, the orchestration models 508 may process data signals 503 and determine that they are irrelevant to generating route segments 504A-D based on the time threshold when the data signals 503 were generated. For instance, data signals 503 may be generated 24 hours or more prior to the generation of route segments 504A-D. In some examples, data signals 503 generated 24 hours or more prior to generating route segments 504A-D may allow for contextual information associated with the merchant location or locational information associated with the requested items to change. For instance, unavailable items may be restocked within the irrelevant time threshold and a data signal 503 indicating the item is unavailable may be irrelevant. The irrelevant time threshold may be a hard limit (e.g., exactly 24 hours, 48 hours, etc.) In some examples, the irrelevant time threshold may be a range (e.g., 24-48 hours). The orchestration models 508 may adjust the irrelevant time threshold based on more recently generated data signals 503, updated merchant data 110, historical trends, etc.

The method 900 may include a step 908, iteratively generating, by the computing system and based on the map data, the initial location data, and the data signals, a plurality of route segments for a user to follow within the merchant location, wherein each route segments indicates a path to a respective item of the plurality of items within the merchant location. For instance, the output data 506 generated by the orchestration models 508 may be received as input by the route generators 504. The route generators 504 may process the output data 506 from the orchestration models 508 and generate one or more route segments 504A-D. In some examples, the route generator 504 may output data 507 indicative of the route segments 504A-D. For instance, the output data 507 may include command instructions to update a user interface of the shopper device 131 that displays the respective route segments 504A-C that leads the shopper 135 to the each respective item included in the order request. In some examples, the output data 507 may include command instructions to iteratively update the user interface of the shopper device 131 to display each route segment of the plurality of route segments 504A-D generated by the route generator 504. In some examples, the output data 507 may include command instructions to update the user interface of the shopper device 131 to display the aggregated shopper route 401. In other examples, the output data 507 may include command instructions to update the user interface of the shopper device 131 to indicate a replacement route segment that indicates a path to lead the shopper 135 to a replacement item.

The route generators 504 may determine all available routes that intersect with the coordinates or locations each requested grocery and score the routes to determine the route segments that account for additional factors such as data signals 503. For instance, the route generators 504 may determine a plurality of possible/candidate routes are available that would begin at the entrance of the merchant location, intersect with the coordinates or location of each requested item including the checkout location, and end at the exit of the merchant location. In some examples, the route generators 504 may score the possible routes and determine that only a subset of those possible/candidate routes will provide the shortest distance. In some examples, the route generators 504 may determine that data signals 503 indicating one or more requested item are located near a high level activity area and determine that only a portion of the subset of possible/candidate routes will avoid the high level activity area. In some examples, the route generators 504 may generate route segments 504A-D based on the distance and activity level of the merchant location and generate output data 507 including command instructions to update the user interface of the shopper device 131 that indicates the route segments 504A-D that will lead the shopper 135 to each requested item.

By way of example, the route generators 504 may generate replacement item route segments that indicates a path that will lead the shopper 135 to a replacement item. For instance, the route generators 504 may receive output data 506 including data signals 503 that indicating that a requested item is unavailable. In some examples, the route generators 504 will generate a replacement route segment that indicates a path that will lead the shopper 135 from their current position (e.g., entrance, last selected item, etc.) to the replacement item based on the data signal 503 indicating the requested item is unavailable. In some examples, the route generators 504 may generate replacement route segments real-time based on receiving output data 506 that includes data signals 503 indicating that a requested item is unavailable. For instance, the route generators 504 may generate a first route segment (e.g., route segment 504A) and a second route segment (e.g., route segment 504B) that indicates a path to the first and second requested item. In some examples, the orchestration model may receive data signals 503 indicating that the second requested item is unavailable while the shopper 135 is en route to the first requested item (e.g., executing route segment 504A) and generate output data 506 indicating that the second requested item is unavailable and identifying the coordinates or location of the replacement item. In some examples, the route generators 504 may generate an updated route segment (e.g., route segment 504B) that indicates a path to the replacement item and output data 504 including command instructions that update the user interface of the shopper device 131 to indicate a path to the replacement item.

The method 900 may include a step 910, outputting, by the computing system, a command instruction to generate a user interface that iteratively displays each route segment of the plurality of route segments based on the user selecting or disregarding the respective items. For instance, the output data 507 may include command instructions to update a user interface of the shopper device 131 that displays the respective route segments 504A-C that leads the shopper 135 to the each respective item included in the order request. In some examples, the output data 507 may include command instructions to iteratively update the user interface of the shopper device 131 to display each route segment of the plurality of route segments 504A-D generated by the route generator 504. In some examples, the output data 507 may include command instructions to update the user interface of the shopper device 131 to display the aggregated shopper route 401.

In some examples, the route generators 504 may iteratively generator route segments 504A-D and output data 507 indicative of the route segments 504A-D based on the shopper 135 selecting or disregarding the requested item. By way of example, the route generators 504 may receive output data 506 and generate route segment 504A that indicates a path from the current location (e.g., the entrance of the merchant location) of the shopper 135 to the location of the first requested item. In some examples, the route generators 504 may generate output 507 including command instructions that update the user interface of the shopper device 131 to display route segment 504A. In some examples, the shopper 135 may execute route segment 504A and indicate that the item has been selected by providing user input via the shopper device. For instance, as depicted in user interface 800A, the shopper 135 may interact (e.g., click) the "scan" user interface element 804 and scan the requested item. The user input may be received by the network system 101 and trigger the route generators 504 to generate route segment 504B. For instance, the route generators 504 may generate route segment 504B that indicates a path from the current location of the shopper 135 (e.g., the location of the first requested item) to the location of the second requested item and output data 507 indicative of route segment 504B. For example, the route generators 504 may generate output data 507 including command instructions to update the user interface of the shopper device 131 to display route segment 504B. The route generators 504 may iteratively generate route segments 504A-D and output data 507 indicative of respective route segments to iteratively update the display of the shopper device 131.

Figure 10:
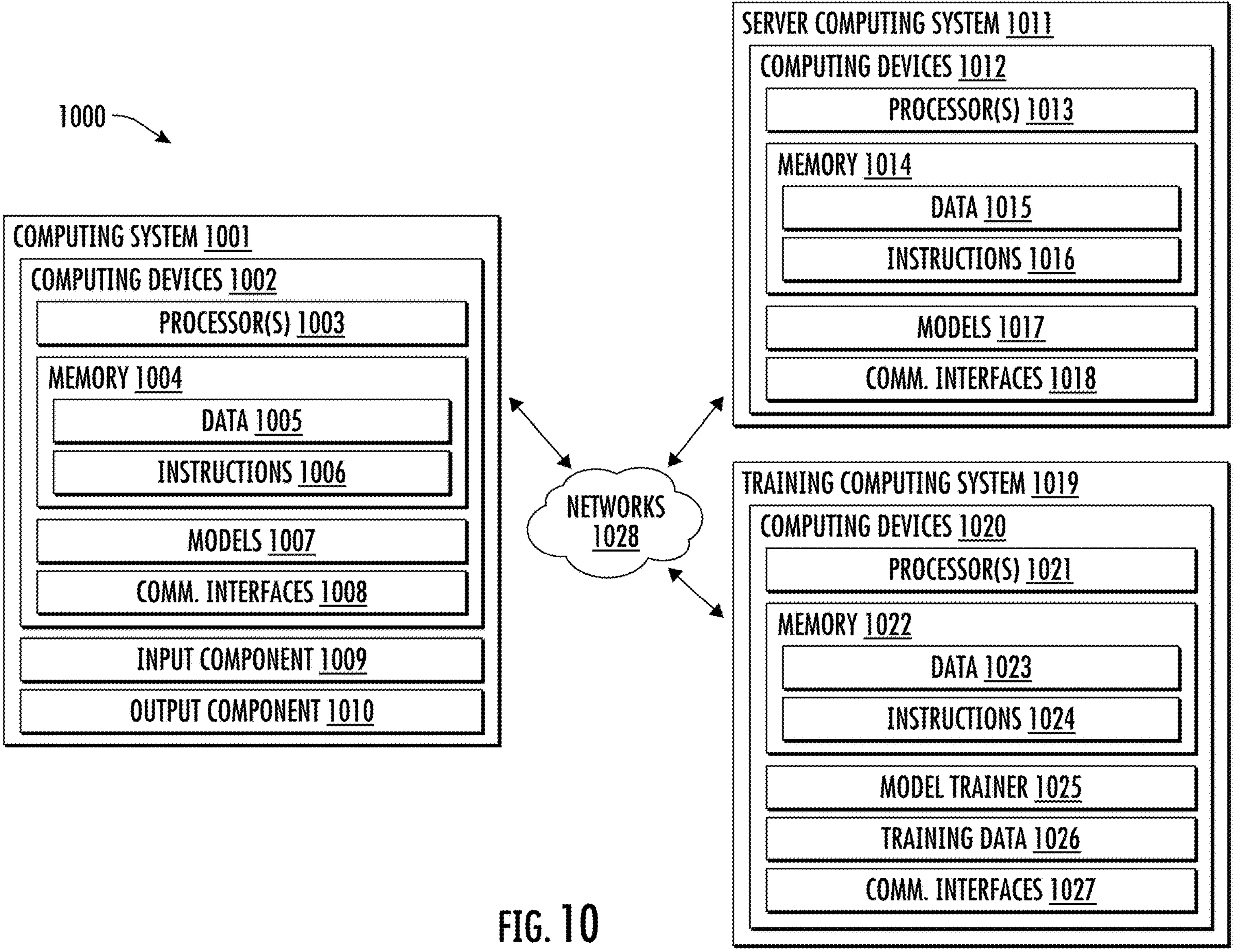
FIG. 10 depicts a block diagram of example computing system components according to example embodiments of the present disclosure.

FIG. 10 depicts a block diagram of an example system 1000 for implementing systems and methods according to example embodiments of the present disclosure. The system 1000 includes a computing system 1001 (e.g., a shopper device 131 corresponding to a shopper 135), a server computing system 1011 (e.g., a network system 101, cloud computing platform), and a training computing system 1019 communicatively coupled over one or more networks 1028.

The computing system 1001 may include one or more computing devices 1002 or circuitry. For instance, the computing system 1001 may include one or more processors 1003 and a memory 1004. In an embodiment, the processors 1003 may be any suitable processing device (e.g., a processor core, a microprocessor, an ASIC, a FPGA, a controller, a microcontroller, etc.) and may be one processor or a plurality of processors that are operatively connected. The memory 1004 may include one or more non-transitory computer-readable storage media, such as RAM, ROM, EEPROM, EPROM, one or more memory devices, flash memory devices, etc., and combinations thereof.

The memory 1004 may store information that may be accessed by the processors 1003. For instance, the memory 1004 (e.g., memory devices) may store data 1005 that may be obtained, received, accessed, written, manipulated, created, and/or stored. The data 1005 may include, for instance, any of the data or information described herein. In some implementations, the computing system 1001 may obtain data from one or more memories that are remote from the computing system 1001.

The memory 1004 may also store computer-readable instructions 1006 that may be executed by the processor(s) 1003. The instructions 1006 may be software written in any suitable programming language or may be implemented in hardware.

The instructions 1006 may be executed in logically and/or virtually separate threads on the processor(s) 1003. For example, the memory 1004 may store instructions 1006 that when executed by the processor(s) 1003 cause the processor(s) 1003 to perform any of the operations, methods and/or processes described herein. In some cases, the memory 1004 may store computer-executable instructions or computer-readable instructions, such as instructions to perform at least a portion of the method of FIG. 9.

In an embodiment, the computing system 1001 may store or include one or more machine-learned models 1007. For example, the machine-learned models 1007 may be or may otherwise include various machine-learned models. In an embodiment, the machine-learned models 1007 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In an embodiment, the one or more machine-learned models 1007 may be received from the server computing system 1011 over networks 1028, stored in the computing system 1001 (e.g., memory 1004), and then used or otherwise implemented by the processor(s) 1003. In an embodiment, the computing system 1001 may implement multiple parallel instances of a single model.

Additionally, or alternatively, one or more machine-learned models 1007 may be included in or otherwise stored and implemented by the server computing system 1011 that communicates with the computing system 1001 according to a client-server relationship. For example, the machine-learned models 1007 may be implemented by the server computing system 1011 as a portion of a web service. Thus, one or more models 1007 may be stored and implemented at the computing system 1001 and/or one or more models 1007 may be stored and implemented at the server computing system 1011.

The computing system 1001 may include one or more communication interfaces 1008. The communication interfaces 1008 may be used to communicate with one or more other systems. The communication interfaces 1008 may include any circuits, components, software, etc. for communicating via one or more networks (e.g., networks 1028). In some implementations, the communication interfaces 1008 may include for example, one or more of a communications controller, receiver, transceiver, transmitter, port, conductors, software and/or hardware for communicating data/information.

The computing system 1001 may also include one or more user input components 1009 that receives user input. For example, the user input component 1009 may be a touch-sensitive component (e.g., a touch-sensitive user interface of a mobile device) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 1001 may include one or more output components 1010. The output components 1010 may include hardware and/or software for audibly or visually producing content. For instance, the output components 1010 may include one or more speakers, earpieces, headsets, handsets, etc. The output components 1010 may include a display device, which may include hardware for displaying a user interface and/or messages for a user. By way of example, the output component 1010 may include a display screen, CRT, LCD, plasma screen, touch screen, TV, projector, tablet, and/or other suitable display components.

The server computing system 1011 may include one or more computing devices 1012. In an embodiment, the server computing system 1011 may include or is otherwise implemented by one or more server computing devices. In instances in which the server computing system 1011 includes plural server computing devices, such server computing devices may operate according to sequential computing architectures, parallel computing architectures, or some combination thereof.

The server computing system 1011 may include a processor(s) 1013 and a memory 1014, also referred to herein as memory 1014. In an embodiment, the processors 1013 may be any suitable processing device (e.g., a processor core, a microprocessor, an ASIC, a FPGA, a controller, a microcontroller, etc.) and may be one processor or a plurality of processors that are operatively connected. The memory 1014 may include one or more non-transitory computer-readable storage media, such as RAM, ROM, EEPROM, EPROM, one or more memory devices, flash memory devices, etc., and combinations thereof. In an embodiment, the memory 1014 may be a memory device, also referred to as a data storage device, which may include an electronic storage device, a magnetic storage device, an optical storage device, an electromagnetic storage device, a semiconductor storage device, or any suitable combination thereof. The memory may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The memory 1014 may store information that may be accessed by the processor(s) 1013. For instance, the memory 1014 (e.g., memory devices) may store data 1015 that may be obtained, received, accessed, written, manipulated, created, and/or stored. The data 1015 may include, for instance, any of the data or information described herein. In some implementations, the server computing system 1011 may obtain data from one or more memories that are remote from the server computing system 1011.

The memory 1014 may also store computer-readable instructions 1016 that may be executed by the processor(s) 1013. The instructions 1016 may be software written in any suitable programming language or may be implemented in hardware. The instructions may include computer-readable instructions, computer-executable instructions, etc.

The instructions 1016 may be executed in logically and/or virtually separate threads on the processor(s) 1013. For example, the memory 1014 may store instructions 1016 that when executed by the processor(s) 1013 cause the processor(s) 1013 to perform any of the operations, methods and/or processes described herein. In some cases, the memory 1014 may store computer-executable instructions or computer-readable instructions, such as instructions to perform at least a portion of the methods of FIG. 9.

The server computing system 1011 may store or otherwise include one or more machine-learned models 1017. The machine-learned models 1017 may include or be the same as the models 1007 stored in computing system 1001. In an embodiment, the machine-learned models 1017 may include an unsupervised learning model. In an embodiment, the machine-learned models 1017 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

The machine-learned models described in this specification may have various types of input data and/or combinations thereof, representing data available to sensors and/or other systems. Input data may include, for example, latent encoding data (e.g., a latent space representation of an input, etc.), statistical data (e.g., data computed and/or calculated from some other data source), sensor data (e.g., raw and/or processed data captured by a sensor of a computing device), or other types of data.

The server computing system 1011 may include one or more communication interfaces 1018. The communication interfaces 1018 may be used to communicate with one or more other systems. The communication interfaces 1018 may include any circuits, components, software, etc. for communicating via one or more networks (e.g., networks 1028). In some implementations, the communication interfaces 1018 may include for example, one or more of a communications controller, receiver, transceiver, transmitter, port, conductors, software and/or hardware for communicating data/information.

The computing system 1001 and/or the server computing system 1011 may train the models 1007, 1017 via interaction with the training computing system 1019 that is communicatively coupled over the networks 1028. The training computing system 1019 may be separate from the server computing system 1011 or may be a portion of the server computing system 1011.

The training computing system 1019 may include one or more computing devices 1020. In an embodiment, the training computing system 1019 may include or is otherwise implemented by one or more server computing devices. In instances in which the training computing system 1019 includes plural server computing devices, such server computing devices may operate according to sequential computing architectures, parallel computing architectures, or some combination thereof.

The training computing system 1019 may include a processor(s) 1021 and a memory 1022, also referred to herein as memory 1022. In an embodiment, the processors 1021 may be any suitable processing device (e.g., a processor core, a microprocessor, an ASIC, a FPGA, a controller, a microcontroller, etc.) and may be one processor or a plurality of processors that are operatively connected. The memory 1022 may include one or more non-transitory computer-readable storage media, such as RAM, ROM, EEPROM, EPROM, one or more memory devices, flash memory devices, etc., and combinations thereof.

In an embodiment, the memory 1022 may be a memory device, also referred to as a data storage device, which may include an electronic storage device, a magnetic storage device, an optical storage device, an electromagnetic storage device, a semiconductor storage device, or any suitable combination thereof. The memory may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The memory 1022 may store information that may be accessed by the processor(s) 1021. For instance, the memory 1022 (e.g., memory devices) may store data 1023 that may be obtained, received, accessed, written, manipulated, created, and/or stored. The data 1023 may include, for instance, any of the data or information described herein. In some implementations, the training computing system 1019 may obtain data from one or more memories that are remote from the training computing system 1019.

The memory 1022 may also store computer-readable instructions 1024 that may be executed by the processor(s) 1021. The instructions 1024 may be software written in any suitable programming language or may be implemented in hardware. The instructions may include computer-readable instructions, computer-executable instructions, etc.

The instructions 1024 may be executed in logically or virtually separate threads on the processor(s) 1021. For example, the memory 1022 may store instructions 1024 that when executed by the processor(s) 1021 cause the processor(s) 1021 to perform any of the operations, methods and/or processes described herein. In some cases, the memory 1022 may store computer-executable instructions or computer-readable instructions, such as instructions to perform at least a portion of the methods of FIG. 9.

The training computing system 1019 may include a model trainer 1025 that trains the machine-learned models 1007, 1017 stored at the computing system 1001 and/or the server computing system 1011 using various training or learning techniques. For example, the models 1007, 1017 may be trained using a loss function. By way of example, for training a machine-learned segmentation or recommendation model, the model trainer 1025 may use a loss function. For example, a loss function can be backpropagated through the model(s) 1007, 1017 to update one or more parameters of the model(s) 1007, 1017 (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

The model trainer 1025 may train the models 1007, 1017 (e.g., a machine-learned clustering model) in an unsupervised fashion. As such, the models 1007, 1017 may be effectively trained using unlabeled data for particular applications or problem domains, which improves performance and adaptability of the models 1007, 1017.

The training computing system 1019 may modify parameters of the models 1007, 1017 (e.g., the machine-learned models 501, 502) based on the loss function such that the models 1007, 1017 may be effectively trained for specific applications in an unsupervised manner without labeled data.

The model trainer 1025 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 1025 may perform a number of generalization techniques (e.g., weight decays, dropouts, etc.) to improve the generalization capability of a model being trained. In particular, the model trainer 1025 may train the machine-learned models 1007, 1017 based on a set of training data 1026.

The training data 1026 may include unlabeled training data for training in an unsupervised fashion. In an example, the training data 1026 may include unlabeled sets of data indicative of varying types of data signals (e.g., determining the type and context of the data signal). The training data 1026 may be specific to a merchant location to help focus the models 1007, 1017 on the particular merchant location.

In an embodiment, training examples may be provided by the computing system 1001 (e.g., mobile device of the shopper). Thus, in such implementations, a model 1007 provided to the computing system 1001 may be trained by the training computing system 1019 in a manner to personalize the model 1007.

The model trainer 1025 may include computer logic utilized to provide desired functionality. The model trainer 1025 may be implemented in hardware, firmware, and/or software controlling a general-purpose processor. For example, in an embodiment, the model trainer 1025 may include program files stored on a storage device, loaded into a memory and executed by one or more processors. In other implementations, the model trainer 1025 may include one or more sets of computer-executable instructions that are stored in a tangible computer-readable storage medium such as RAM, hard disk, or optical or magnetic media.

The training computing system 1019 may include one or more communication interfaces 1027. The communication interfaces 1027 may be used to communicate with one or more other systems. The communication interfaces 1027 may include any circuits, components, software, etc. for communicating via one or more networks (e.g., networks 1028). In some implementations, the communication interfaces 1027 may include for example, one or more of a communications controller, receiver, transceiver, transmitter, port, conductors, software and/or hardware for communicating data/information.

The one or more networks 1028 may be any type of communications network, such as a local area network (e.g., intranet), wide area network (e.g., Internet), or some combination thereof and may include any number of wired or wireless links. In general, communication over a network 1028 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 10 illustrates one example computing system that may be used to implement the present disclosure. Other computing systems may be used as well. For example, in an embodiment, the computing system 1001 may include the model trainer 1025 and the training data 1026. In such implementations, the models 1007, 1017 may be both trained and used locally at the computing system 1001. In some of such implementations, the computing system 1001 may implement the model trainer 1025 to personalize the models 1007, 1017.

Computing tasks discussed herein as being performed at certain computing device(s)/systems may instead be performed at another computing device/system, or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein may be adapted, rearranged, expanded, omitted, combined, or modified in various ways without deviating from the scope of the present disclosure.

Some implementations are described with a reference numeral for example illustrated purposes and are not meant to be limiting.

What is claimed is:

1. A computer-implemented method comprising:

accessing, by a computing system, data indicative of a plurality of items;

accessing, by the computing system, map data indicative of a layout of an indoor location;

correlating, by the computing system and based on the map data, an identifier associated with each of the plurality of items with an initial location within the indoor location;

obtaining, over a network, one or more data signals generated by a mobile computing device located within the indoor location, wherein the one or more data signals are based on motion of the mobile computing device;

processing, by the computing system using a machine-learned model, the one or more data signals from the mobile computing device located within the indoor location, wherein processing the one or more data signals comprises determining, contextual information indicative of a level of activity associated with the indoor location;

iteratively generating, by the computing system and based on the map data, the initial location, and the contextual information, a route segment within the indoor location, wherein the route segment indicates a path to a respective item of the plurality of items; and outputting, by the computing system, a command instruction to generate a user interface that displays the route segment.

2. The computer-implemented method of claim 1, further comprising:

receiving, by the computing system, input data based on a user associated with the mobile computing device disregarding the respective item, wherein the user disregarding the respective item is indicative of the respective item being unavailable at the indoor location;

determining, by the computing system, a replacement item and a replacement item location, wherein the replacement item is indicative of an alternative item to replace the respective item;

generating, by the computing system, an updated plurality of route segments wherein at least one of the updated plurality of route segments indicates a path to the replacement item location; and outputting, by the computing system, an updated command instruction to generate an updated user interface that displays the updated plurality of route segments.

3. The computer-implemented method of claim 1, further comprising:

determining, by the computing system, a category of each of the plurality of items, wherein the category is indicative of a region of the indoor location;

determining, by the computing system, one or more items of the plurality of items is located in a common region of the indoor location; and outputting, by the computing system, a command instruction to generate an item user interface that displays each of the plurality of items based on the category.

4. The computer-implemented method of claim 1, wherein processing one or more data signals comprises:

determining, by the computing system, the one or more data signals were generated within a threshold time associated with the data indicative of the plurality of items.

5. The computer-implemented method of claim 1, wherein processing the one or more data signals comprises determining an approximate location of the mobile computing device.

6. The computer-implemented method of claim 1, wherein:

the motion is indicative of at least one of: (i) an orientation, (ii) acceleration, or (iii) an elevation of the mobile computing device and the method further comprises determining, by the computing system, a location of the mobile computing device within the location based on the motion, the location being associated with a position on the layout of the location.

7. The computer-implemented method of claim 1, further comprising:

determining, by the computing system, each of the plurality of items has been respectively selected or disregarded;

generating, by the computing system, a checkout route segment to a checkout location within the indoor location; and outputting, by the computing system, a command instruction to display the checkout route segment.

8. The computer-implemented method of claim 1, wherein iteratively generating the route segment further comprises:

accessing, by the computing system, priority data for each of the plurality of items wherein the priority data indicates items to satisfy of the data indicative of the plurality of items;

determining, by the computing system, an order of the route segment based on the priority data; and generating, by the computing system, a plurality of prioritized route segments wherein the plurality of prioritized route segments indicates a path to one or more priority items prior to a path of one or more non-priority items.

9. The computer-implemented method of claim 8, further comprising:

determining, by the computing system, at least one priority item of the one or more priority items is unavailable based on disregarding the priority item; and outputting, by the computing system, an updated command instruction to generate a cancellation user interface indicating the data indicative of the plurality of items has been cancelled.

10. A computing system comprising:

one or more processors; and one or more non-transitory, computer-readable media storing instructions that are executable by the one or more processors to cause the computing system to perform operations, the operations comprising:

accessing data indicative of a plurality of items;

accessing map data indicative of a layout of an indoor location;

correlating, based on the map data, an identifier associated with each of the plurality of items with an initial location within the indoor location;

obtaining, over a network, one or more data signals generated by a mobile computing device located within the indoor location, wherein the one or more data signals are based on motion of the mobile computing device;

processing, using a machine-learned model, the one or more data signals from the mobile computing device located within the indoor location, wherein processing the one or more data signals comprises determining, contextual information indicative of a level of activity associated with the indoor location;

based on the map data, the initial location, and the contextual information, iteratively generating a route segment within the indoor location, wherein the route segment indicates a path to a respective item of the plurality of items within the indoor location; and outputting a command instruction to generate a user interface that displays the route segment.

11. The computing system of claim 10 further comprising:

receiving input data based on a user associated with the mobile computing device disregarding the respective item, wherein the user disregarding the respective item is indicative of the respective item being unavailable at the indoor location;

determining a replacement item and a replacement item location, wherein the replacement item is indicative of an alternative item to replace the respective item;

generating an updated plurality of route segments wherein at least one of the updated plurality of route segments indicates a path to the replacement item location; and outputting an updated command instruction to generate an updated user interface that displays the updated plurality of route segments.

12. The computing system of claim 10 further comprising:

determining, by the computing system, a category of each of the plurality of items, wherein the category is indicative of a region of the indoor location;

determining, by the computing system, one or more items of the plurality of items is located in a common region of the indoor location; and outputting, by the computing system, a command instruction to generate an item user interface that displays each of the plurality of items based on the category.

13. The computing system of claim 10, wherein processing one or more data signals comprises:

determining, by the computing system, the one or more data signals were generated within a threshold time associated with the data indicative of the plurality of items.

14. The computing system of claim 10, wherein processing the one or more data signals comprises determining an approximate location of the mobile computing device.

15. The computing system of claim 10, wherein the motion is indicative of at least one of: (i) an orientation, (ii) acceleration, or (iii) an elevation of the mobile computing device and the operations further comprise:

determining, by the computing system, a location of the mobile computing device within the location based on the motion, the location being associated with a position on the layout of the indoor location.

16. The computing system of claim 10, wherein the operations comprise:

determining, by the computing system, each of the plurality of items has been selected or disregarded;

generating, by the computing system, a checkout route segment to a checkout location within the indoor location; and outputting, by the computing system, a command instruction to display the checkout route segment.

17. The computing system of claim 10, wherein iteratively generating the route segment further comprises:

accessing, by the computing system, priority data for each of the plurality of items wherein the priority data indicates items to satisfy the data indicative of the plurality of items;

determining, by the computing system, an order of the route segment based on the priority data; and generating, by the computing system, a plurality of prioritized route segments wherein the plurality of prioritized route segments indicates a path to one or more priority items prior to a path of one or more non-priority items.

18. The computing system of claim 17, further comprising:

determining, by the computing system, at least one priority item of the one or more priority items is unavailable based on disregarding the priority item; and outputting, by the computing system, an updated command instruction to generate a cancellation user interface indicating the data indicative of the plurality of items has been cancelled.

19. A computer-implemented method comprising:

accessing, by a computing system, data indicative of a plurality of items;

accessing, by the computing system, map data indicative of a layout of an indoor location;

correlating, by the computing system and based on the map data, an identifier associated with each of the plurality of items with an initial location within the indoor location;

generating, by the computing system and based on the map data and the initial location, a first route segment to a first location of a first item within the indoor location;

outputting, by the computing system, a command instruction to generate a user interface that indicates the first route segment and the first location of the first item within the indoor location;

obtaining, over a network, one or more data signals generated by a mobile computing device located within the indoor location, wherein the one or more data signals are based on motion of the mobile computing device;

processing, by the computing system using a machine-learned model, the one or more data signals from the mobile computing device located within the indoor location, wherein processing the one or more data signals comprises determining, contextual information indicative of a level of activity associated with the indoor location;

generating, by the computing system and based on the map data and the contextual information, a second route segment from the first location to a second location of a second item within the indoor location;

receiving, by the computing system, user input data indicating the first item was selected or disregarded; and based on receiving the user input data, outputting, by the computing system, a command instruction to display the second route segment and the second location of the second item within the indoor location.

20. The computer-implemented method of claim 19, further comprising:

determining, by the computing system, a replacement item and a replacement item location, wherein the replacement item is indicative of an alternative item to replace the second item;

generating, by the computing system, an updated second route segment wherein the updated second route segment indicates a path to the replacement item location; and outputting, by the computing system, an updated command instruction to generate an updated user interface that displays the updated second route segment.

* * * * *